US012632566B2

(12) United States Patent
Inokuchi et al.

(10) Patent No.: US 12,632,566 B2
(45) Date of Patent: May 19, 2026

(54) SECURITY COUNTERMEASURE PLANNING SYSTEM, SECURITY COUNTERMEASURE PLANNING METHOD, AND PROGRAM

(71) Applicant: NEC Corporation, Tokyo (JP)

(72) Inventors: Masaki Inokuchi, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 18/713,805

(22) PCT Filed: Dec. 7, 2021

(86) PCT No.: PCT/JP2021/044928
§ 371 (c)(1),
(2) Date: May 28, 2024

(87) PCT Pub. No.: WO2023/105629
PCT Pub. Date: Jun. 15, 2023

(65) Prior Publication Data
US 2025/0021646 A1 Jan. 16, 2025

(51) Int. Cl.
*G06F 21/57* (2013.01)
*G06F 21/56* (2013.01)
(52) U.S. Cl.
CPC ............ *G06F 21/577* (2013.01); *G06F 21/56* (2013.01)
(58) Field of Classification Search
CPC .......... G06F 18/2413–24147; G06F 21/56568; G06F 21/57; G06F 21/577; G06F 21/6245–6263; G06F 2221/034
See application file for complete search history.

(56) References Cited

U.S. PATENT DOCUMENTS

| | | | |
|---|---|---|---|
| 2007/0273497 A1 | 11/2007 | Kuroda et al. | |
| 2013/0074188 A1* | 3/2013 | Giakouminakis | G06F 21/577 726/25 |
| 2021/0110047 A1 | 4/2021 | Fang | |
| 2022/0342999 A1 | 10/2022 | Mizushima et al. | |
| 2024/0289719 A1* | 8/2024 | Matsuba | G06Q 10/0635 |

FOREIGN PATENT DOCUMENTS

| | | |
|---|---|---|
| JP | 2000-132767 A | 5/2000 |
| JP | 2005-135239 A | 5/2005 |
| JP | 2005-234840 A | 9/2005 |
| JP | 2005-293267 A | 10/2005 |
| JP | 2007-316821 A | 12/2007 |
| JP | 2009-110177 A | 5/2009 |
| JP | 2010-176274 A | 8/2010 |
| JP | 2016-143299 A | 8/2016 |
| WO | 2021/059471 A1 | 4/2021 |

OTHER PUBLICATIONS

International Search Report for PCT Application No. PCT/JP2021/044928, mailed on Mar. 8, 2022.

* cited by examiner

*Primary Examiner* — Kevin Bechtel
(74) *Attorney, Agent, or Firm* — Sughrue Mion, PLLC

(57) ABSTRACT

A security countermeasure planning system includes a functional part which calculates one or more risk values of one or more resources included in a system to be diagnosed, a risk change estimation part which estimates one or more future risk estimation values of the one or more risk values of the one or more resources which the functional part calculates, and a countermeasure determination part which selects a countermeasure plan based on the one or more future risk estimation values estimated by the risk change estimation part.

16 Claims, 21 Drawing Sheets

Figure 4:
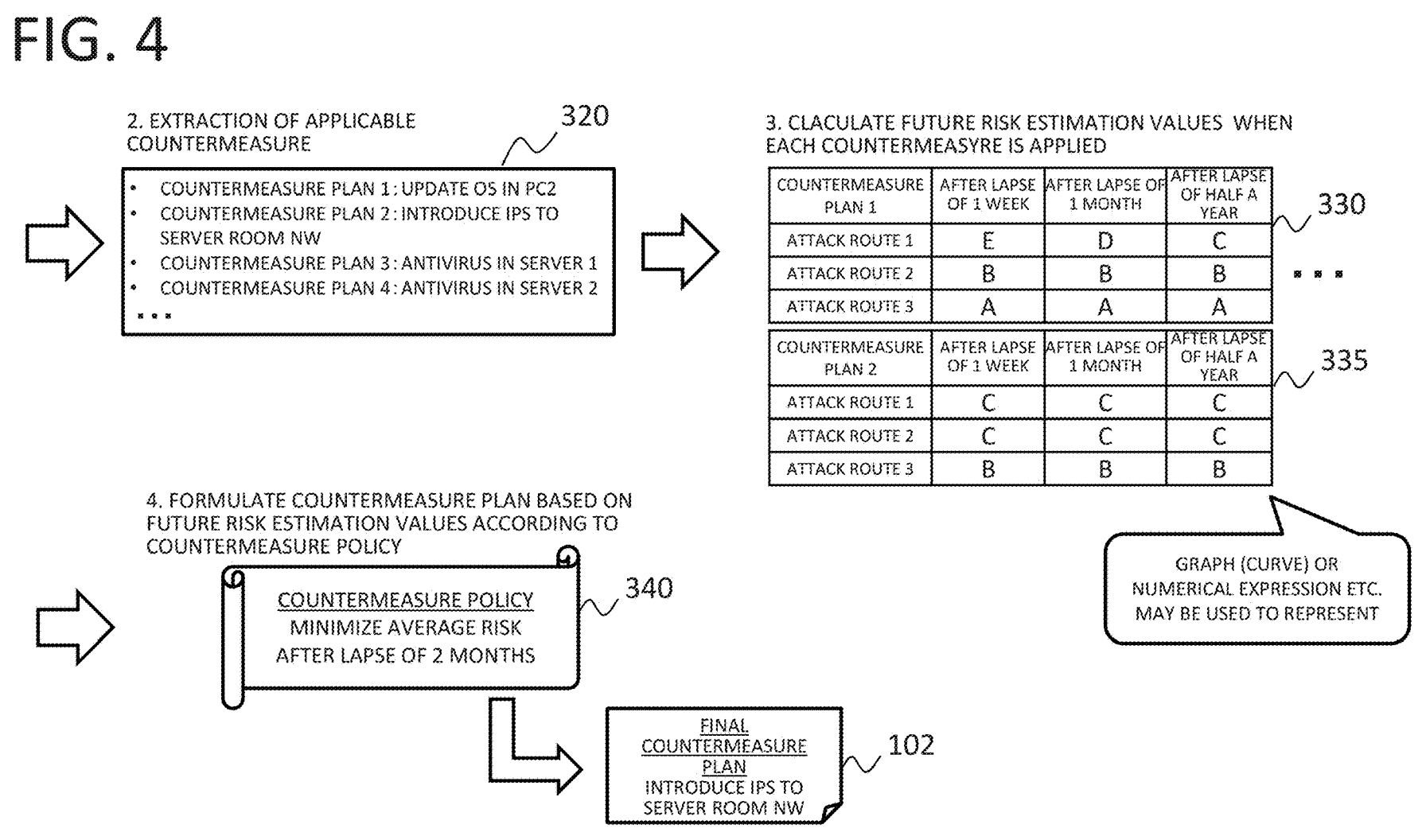

2. EXTRACTION OF APPLICABLE COUNTERMEASURE    320

- COUNTERMEASURE PLAN 1: UPDATE OS IN PC2
- COUNTERMEASURE PLAN 2: INTRODUCE IPS TO SERVER ROOM NW
- COUNTERMEASURE PLAN 3: ANTIVIRUS IN SERVER 1
- COUNTERMEASURE PLAN 4: ANTIVIRUS IN SERVER 2
- ...

3. CLACULATE FUTURE RISK ESTIMATION VALUES WHEN EACH COUNTERMEASYRE IS APPLIED

| COUNTERMEASURE PLAN 1 | AFTER LAPSE OF 1 WEEK | AFTER LAPSE OF 1 MONTH | AFTER LAPSE OF HALF A YEAR |
|---|---|---|---|
| ATTACK ROUTE 1 | E | D | C |
| ATTACK ROUTE 2 | B | B | B |
| ATTACK ROUTE 3 | A | A | A |

330    . . . .

| COUNTERMEASURE PLAN 2 | AFTER LAPSE OF 1 WEEK | AFTER LAPSE OF 1 MONTH | AFTER LAPSE OF HALF A YEAR |
|---|---|---|---|
| ATTACK ROUTE 1 | C | C | C |
| ATTACK ROUTE 2 | C | C | C |
| ATTACK ROUTE 3 | B | B | B |

335

GRAPH (CURVE) OR NUMERICAL EXPRESSION ETC. MAY BE USED TO REPRESENT

4. FORMULATE COUNTERMEASURE PLAN BASED ON FUTURE RISK ESTIMATION VALUES ACCORDING TO COUNTERMEASURE POLICY

340

COUNTERMEASURE POLICY
MINIMIZE AVERAGE RISK
AFTER LAPSE OF 2 MONTHS

102

FINAL
COUNTERMEASURE
PLAN
INTRODUCE IPS TO
SERVER ROOM NW

| DATE AND TIME | EVENT |
|---|---|
| 2019/7/1 | INSTALL ◯◯ TO Office-PC1 |
| 2019/7/2 | PERMIT COMMUNICATION ◯◯ BETWEEN ADMINISTRATIVE NW AND CONTROL NW |
| 2019/9/3 | UPDATE OS OF Office-PC1 |
| 2019/10/4 | INTRODUCE Office-PC2 |
| ‥ | |

CONFIGURATION CHANGE HISTORY

143

| ANALYSIS ASSET NAME | ASSETS BEFORE AGGREGATION |
|---|---|
| OfficePC | OfficePC1, OfficePC2 |
| PLC | PLC |
| HMI | HMI |
| ‥ | |

AGGREGATION STATE OF ASSETS

142

| ASSET NAME | ASSET TYPE |
|---|---|
| OfficePC1 | ADMINISTRATIVE PC |
| OfficePC2 | ADMINISTRATIVE PC |
| PLC | CONTROL APPARATUS |
| HMI | CONTROL APPARATUS |
| ‥ | ‥ |

ASSET TYPE

144

| ASSET NAME | SCHEDULED DATE TO STOP USING | SCHEDULED DATE OF DISPOSAL |
|---|---|---|
| OfficePC1 | 2022/5/1 | 2022/7/1 |
| OfficePC2 | 2022/10/1 | 2022/12/1 |

OPERATION INFORMATION

FUTURE RISK ESTIMATION INFORMATION PART

| SOFTWARE NAME | VULNERABILITY CVSSv3 SCORE | ATTACK CODE APPEARANCE PROBABILITY | | |
| --- | --- | --- | --- | --- |
| | | AFTER LAPSE OF 1 WEEK | AFTER LAPSE OF 1 MONTH | AFTER LAPSE OF HALF A YEAR |
| Software X | MORE THAN OR EQUAL TO 6.0 | 0.0001 | 0.0001 | 0.0002 |
| | LESS THAN OR EQUAL TO 6.0 | 0.000001 | 0.000001 | 0.000002 |
| OS Y | MORE THAN OR EQUAL TO 6.0 | 0.001 | 0.01 | 0.1 |
| | LESS THAN OR EQUAL TO 6.0 | 0.0001 | 0.0001 | 0.0001 |
| ... | | ... | | |

ATTACK CODE APPEARANCE PROBABILITY

146

| ATTACK TARGET | THREAT INFORMATION | PERIOD |
| --- | --- | --- |
| CVE-XXXX | PREVALENTNESS OF ATTACK USING MALWARE YY | 2021/8~2021/10 |
| ALL | EVENT PERIOD | 2021/12~2022/1 |
| ... | ... | ... |

THREAD PREDICTION

FUTURE RISK ESTIMATION INFORMATION PART

FIG. 9

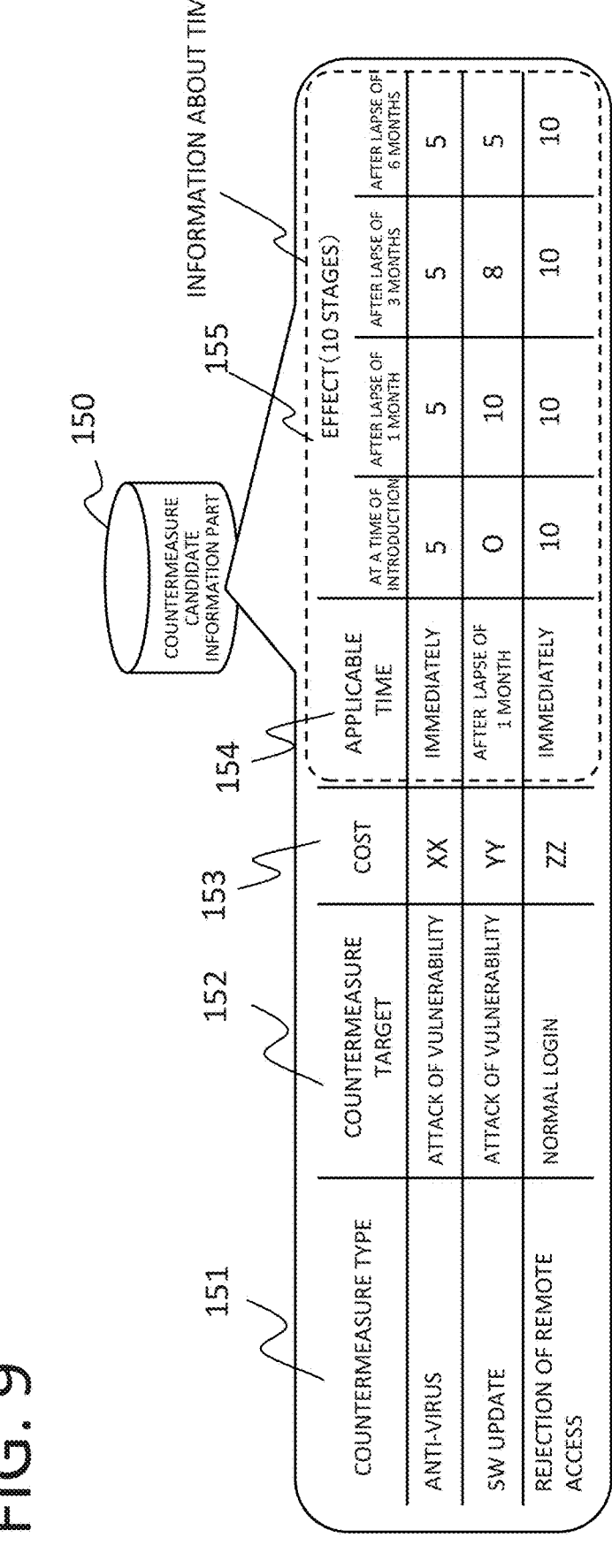

150

151  152  153  154  155

INFORMATION ABOUT TIME

| COUNTERMEASURE TYPE | COUNTERMEASURE TARGET | COST | APPLICABLE TIME | EFFECT (10 STAGES) | | | |
| --- | --- | --- | --- | --- | --- | --- | --- |
| | | | | AT A TIME OF INTRODUCTION | AFTER LAPSE OF 1 MONTH | AFTER LAPSE OF 3 MONTHS | AFTER LAPSE OF 6 MONTHS |
| ANTI-VIRUS | ATTACK OF VULNERABILITY | XX | IMMEDIATELY | 5 | 5 | 5 | 5 |
| SW UPDATE | ATTACK OF VULNERABILITY | YY | AFTER LAPSE OF 1 MONTH | 0 | 10 | 8 | 5 |
| REJECTION OF REMOTE ACCESS | NORMAL LOGIN | ZZ | IMMEDIATELY | 10 | 10 | 10 | 10 |

COUNTERMEASURE CANDIDATE INFORMATION PART

EXAMPLE OF INFORMATION STORED IN COUNTERMEASURE CANDIDATE INFORMATION PART

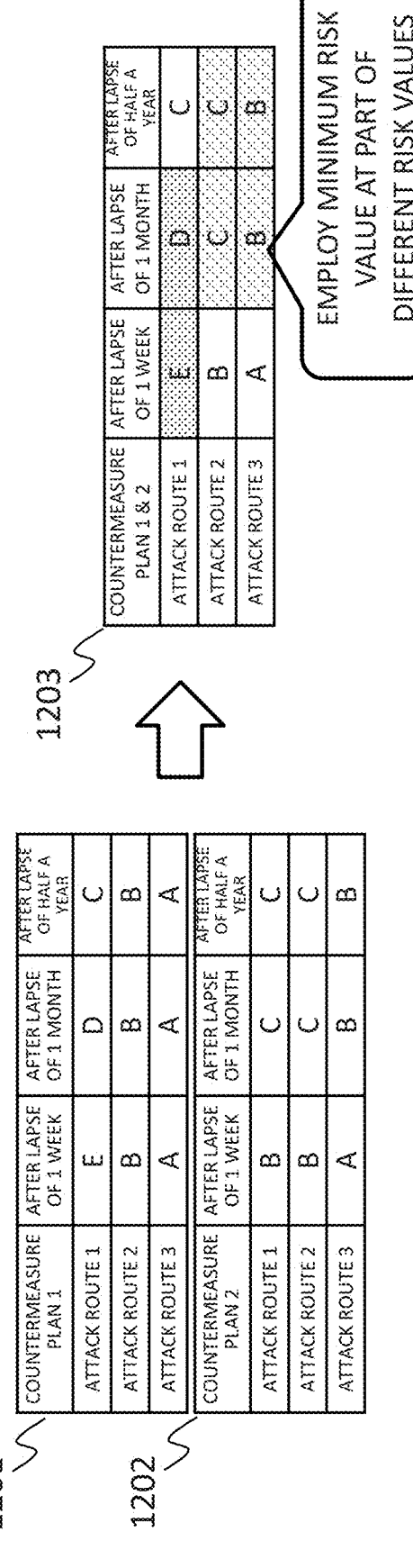

1201

| COUNTERMEASURE PLAN 1 | AFTER LAPSE OF 1 WEEK | AFTER LAPSE OF 1 MONTH | AFTER LAPSE OF HALF A YEAR |
|---|---|---|---|
| ATTACK ROUTE 1 | E | D | C |
| ATTACK ROUTE 2 | B | B | B |
| ATTACK ROUTE 3 | A | A | A |

1202

| COUNTERMEASURE PLAN 2 | AFTER LAPSE OF 1 WEEK | AFTER LAPSE OF 1 MONTH | AFTER LAPSE OF HALF A YEAR |
|---|---|---|---|
| ATTACK ROUTE 1 | B | C | C |
| ATTACK ROUTE 2 | B | C | C |
| ATTACK ROUTE 3 | A | B | B |

1203

| COUNTERMEASURE PLAN 1 & 2 | AFTER LAPSE OF 1 WEEK | AFTER LAPSE OF 1 MONTH | AFTER LAPSE OF HALF A YEAR |
|---|---|---|---|
| ATTACK ROUTE 1 | E | D | C |
| ATTACK ROUTE 2 | B | C | C |
| ATTACK ROUTE 3 | A | B | B |

EMPLOY MINIMUM RISK VALUE AT PART OF DIFFERENT RISK VALUES

FIG. 13

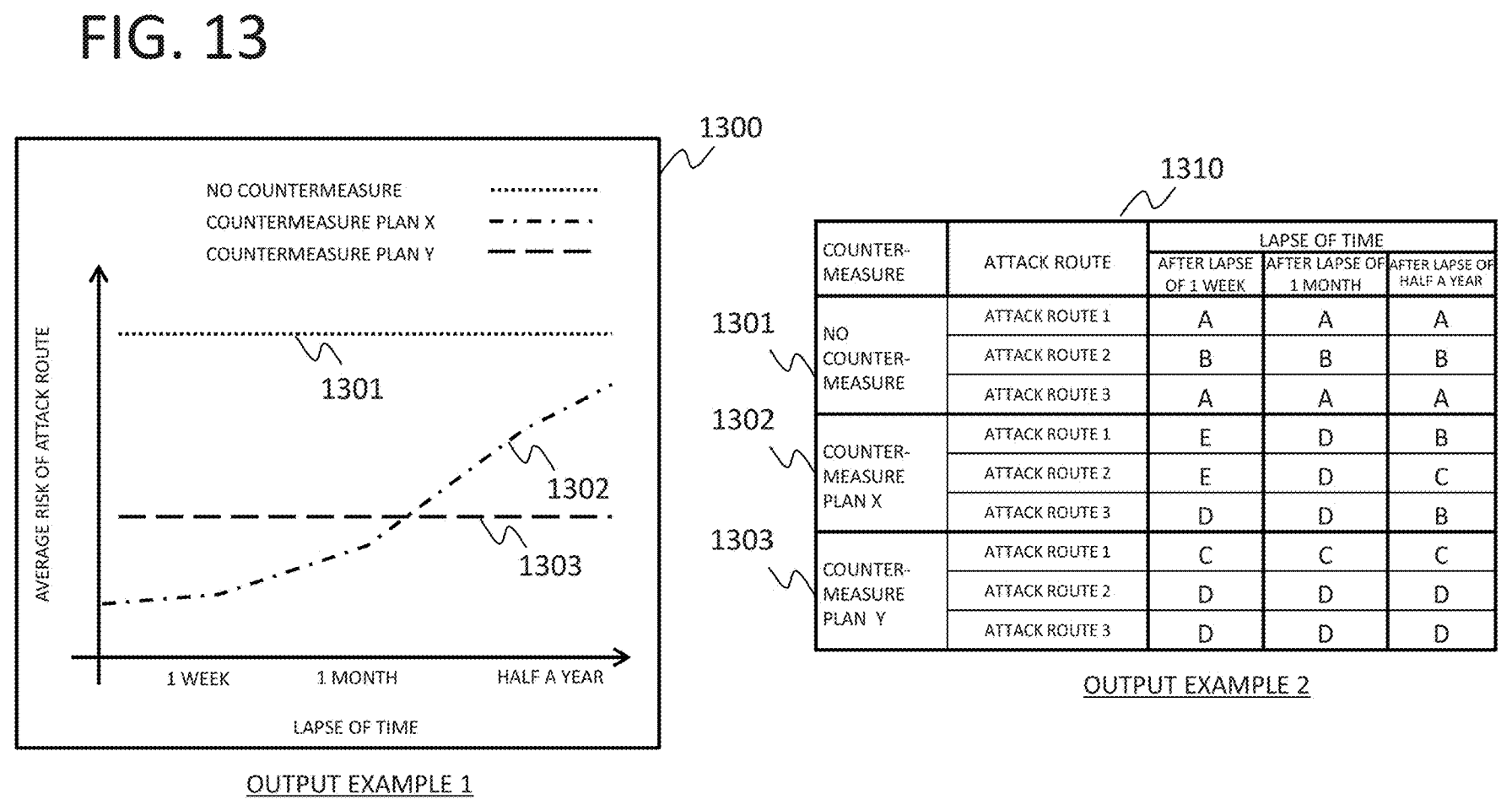

| COUNTER-MEASURE | ATTACK ROUTE | AFTER LAPSE OF 1 WEEK | AFTER LAPSE OF 1 MONTH | AFTER LAPSE OF HALF A YEAR |
|---|---|---|---|---|
| NO COUNTER-MEASURE | ATTACK ROUTE 1 | A | A | A |
| | ATTACK ROUTE 2 | B | B | B |
| | ATTACK ROUTE 3 | A | A | A |
| COUNTER-MEASURE PLAN X | ATTACK ROUTE 1 | E | D | B |
| | ATTACK ROUTE 2 | E | D | C |
| | ATTACK ROUTE 3 | D | D | B |
| COUNTER-MEASURE PLAN Y | ATTACK ROUTE 1 | C | C | C |
| | ATTACK ROUTE 2 | D | D | D |
| | ATTACK ROUTE 3 | D | D | D |

LAPSE OF TIME

1310

OUTPUT EXAMPLE 2

1301

1302

1303

1300

OUTPUT EXAMPLE 1

NO COUNTERMEASURE

COUNTERMEASURE PLAN X

COUNTERMEASURE PLAN Y

AVERAGE RISK OF ATTACK ROUTE

1301

1302

1303

1 WEEK     1 MONTH     HALF A YEAR

LAPSE OF TIME

| COUNTERMEASURE PLAN | AFTER LAPSE OF 1 WEEK | AFTER LAPSE OF 1 MONTH | AFTER LAPSE OF HALF A YEAR |
|---|---|---|---|
| ATTACK ROUTE 1 | E | E | C |
| ATTACK ROUTE 2 | E | C | B |
| ATTACK ROUTE 3 | E | C | B |

102

1701

1702

THRESHOLD VALUE

AVERAGE RISK VALUE

1 WEEK   1 MONTH   3 MONTHS   HALF A YEAR

NEXT DIAGNOSTIC TIME AFTER LAPSE OF 3 MONTHS

Figure 19:
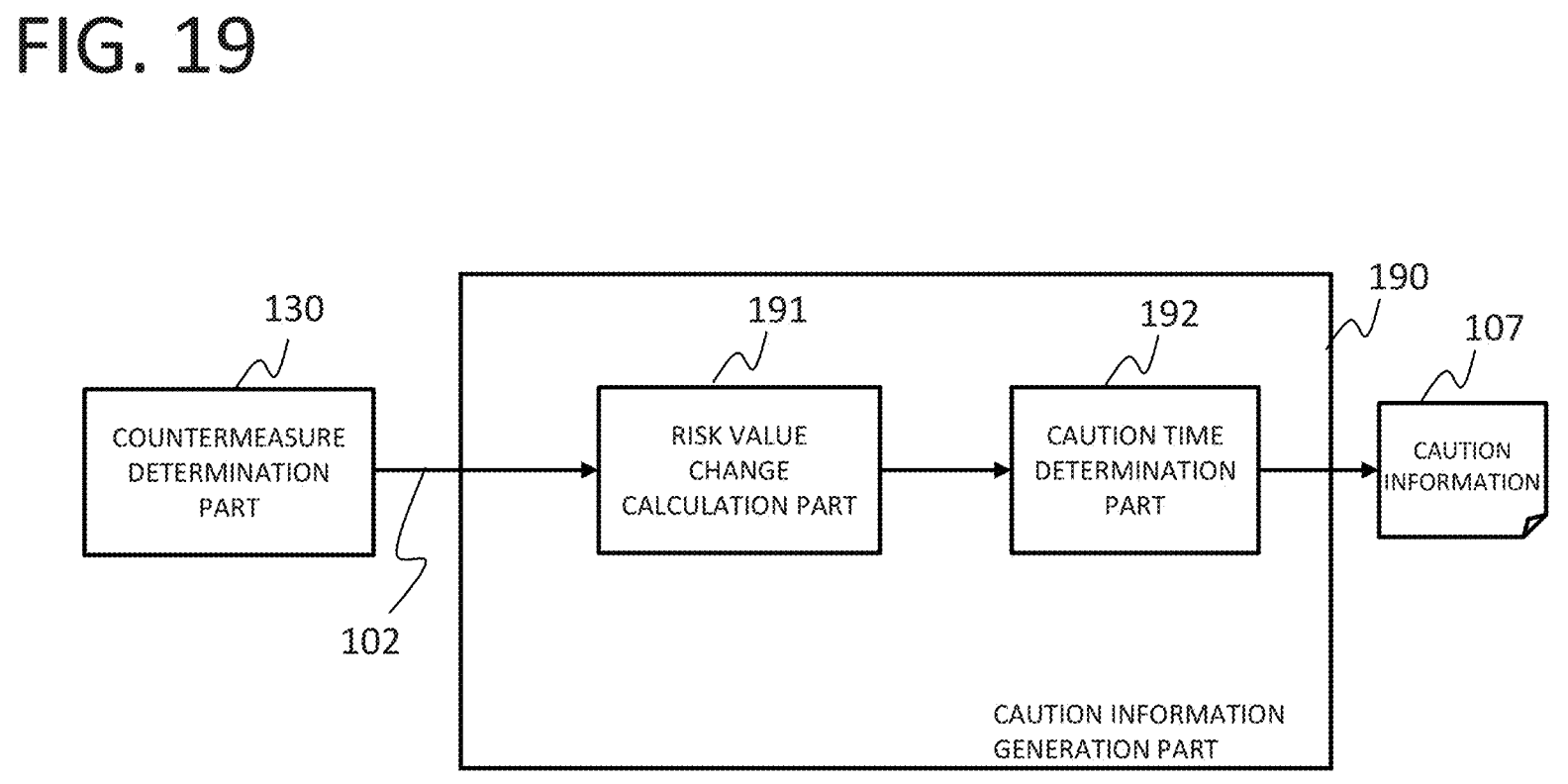

130 COUNTERMEASURE DETERMINATION PART

102

190 CAUTION INFORMATION GENERATION PART

191 RISK VALUE CHANGE CALCULATION PART

192 CAUTION TIME DETERMINATION PART

107 CAUTION INFORMATION

CAUTION INFORMATION

ATTACK ROUTE 1 : AFTER LAPSE OF 5 MONTHS
ATTACK ROUTE 2 : AFTER LAPSE OF 1 MONTH UNTIL
LAPSE OF 5 MONTHS, AFTER LAPSE OF 6 MONTHS UNTIL
LAPSE OF 10 MONTHS ...
ATTACK ROUTE 3 : NONE

FIG. 21

SECURITY COUNTERMEASURE PLANNING SYSTEM, SECURITY COUNTERMEASURE PLANNING METHOD, AND PROGRAM

This application is a National Stage Entry of PCT/JP2021/044928 filed on Dec. 7, 2021, the contents of all of which are incorporated herein by reference, in their entirety.

FIELD

The present invention relates to a security countermeasure planning system, a security countermeasure planning method, and a program.

BACKGROUND

In a risk analysis of a system to be diagnosed, it is performed to extract an attack graph including information of one or more attack methods, one or more attack conditions, and one or more hosts which are passed from an intrusion point to an attack target based on various configuration information at a time of analysis. In a planning of countermeasures against an attack, risks are reduced by introducing countermeasures in a way that one or more attack methods and one or more attack conditions included in an attack route are not established.

Patent Literature (PTL) 1 relates to a planning and designing method of a security system for creating PP (Protection Profile)/ST (Security Target) prescribed in an international standard (Common Criteria) concerning a security system.

PTL 2 relates to an information security management assistance system which performs assistance in a way that information security management is effectively performed.

PTL 3 relates to a security monitoring apparatus which enables to recognize a status of a security risk and implement a countermeasure.

PTL 4 relates to a risk management apparatus which assists to plan and perform consistent risk countermeasures for a whole business process.

PTL 5 relates to a security risk analysis assistance apparatus which can present an objective index to a user in risk evaluation.

PTL 1: Japanese Patent Kokai Publication No: 2000-132767
PTL 2: Japanese Patent Kokai Publication No: 2005-293267
PTL 3: Japanese Patent Kokai Publication No: 2007-316821
PTL 4: Japanese Patent Kokai Publication No: 2010-176274
PTL 5: WO2021/059471A1

SUMMARY

The following analysis has been given by the present invention.

However, an effect of a countermeasure and a risk of a threat existing in a system may change by lapse of time depending on whether a countermeasure can be promptly introduced or it takes time to introduce a countermeasure, a time change of an effect of a countermeasure due to whether a countermeasure is permanent or temporary, and a time change of threat such as appearance of an attack code or change of configuration of a system to be diagnosed, and so on. Therefore, a countermeasure may not be effective in a case where the countermeasure is formulated by only taking a risk at a time of a risk analysis for a system to be diagnosed into account.

It is an object of the present invention to provide a security countermeasure planning system, a security countermeasure planning method, and a program which contribute to select countermeasures based on time change of security risk existing in a system.

According to a first aspect of the present invention, there is provided a security countermeasure planning system, including:

a functional part which calculates one or more risk values of one or more resources included in a system to be diagnosed;

a risk change estimation part which estimates one or more future risk estimation values of the one or more risk values of the one or more resources which the functional part calculates; and a countermeasure determination part which selects a countermeasure plan based on the one or more future risk estimation values estimated by the risk change estimation part.

According to a second aspect of the present invention, there is provided a security countermeasure planning method, including:

calculating one or more risk values of one or more resources included in a system to be diagnosed;

risk change estimation of estimating one or more future risk estimation values of the calculated one or more risk values of the one or more resources; and countermeasure determination of selecting a countermeasure plan based on the estimated one or more future risk estimation values.

According to a third aspect of the present invention, there is provided a program which causes a computer to perform processings of:

calculating one or more risk values of one or more resources included in a system to be diagnosed;

risk change estimation of estimating one or more future risk estimation values of the calculated one or more risk values of the one or more resources; and countermeasure determination of selecting a countermeasure plan based on the estimated one or more future risk estimation values. Note, this program can be recorded in a computer-readable storage medium. The storage medium can be non-transitory one, such as a semiconductor memory, a hard disk, a magnetic recording medium, an optical recording medium, and so on. The present invention can be realized by a computer program product.

According to the present invention, it is possible to provide a security countermeasure planning system, a security countermeasure planning method, and a program which contribute to select countermeasures based on time change of security risk existing in a system.

BRIEF DESCRIPTION OF DRAWINGS

FIG. 1 is a diagram illustrating an example of a configuration of a security countermeasure planning system according to an example embodiment of the present invention.

FIG. 4 is a diagram illustrating an outline of an example of an operation of a security countermeasure planning system according to the example embodiment of the present invention.

FIG. 5 is a diagram illustrating an example of a configuration of a security countermeasure planning system according to a first example embodiment of the present invention.

FIG. 7 is a diagram illustrating an example of information stored in a future risk estimation information part of a security countermeasure planning system according to the first example embodiment of the present invention.

FIG. 8 is a diagram illustrating an example of information stored in a future risk estimation information part of a security countermeasure planning system according to the first example embodiment of the present invention.

FIG. 9 is a diagram illustrating an example of information stored in a countermeasure candidate information part of a security countermeasure planning system according to the first example embodiment of the present invention.

FIG. 10 is a diagram illustrating an example of a schematic configuration of a risk change estimation part of a security countermeasure planning system according to the first example embodiment of the present invention.

FIG. 11 is a diagram illustrating an example of a schematic configuration of a countermeasure determination part of a security countermeasure planning system according to the first example embodiment of the present invention.

FIG. 12 is a diagram illustrating an outline of an example of an operating of a countermeasure determination part of a security countermeasure planning system according to the first example embodiment of the present invention.

FIG. 13 is a diagram illustrating examples of outputs of a countermeasure determination part of a security countermeasure planning system according to the first example embodiment of the present invention.

FIG. 14 is a diagram illustrating an example of a configuration of a security countermeasure planning system according to a second example embodiment of the present invention.

FIG. 16 is a diagram illustrating an example of a configuration of diagnostic time determination part of a security countermeasure planning system according to the third example embodiment of the present invention.

FIG. 19 is a diagram illustrating an example of a configuration of a caution information generation part of a security countermeasure planning system according to the fourth example embodiment of the present invention.

FIG. 21 is a diagram illustrating a configuration of a computer which can make up a security countermeasure planning system of the present invention.

EXAMPLE EMBODIMENTS

Figure 2:
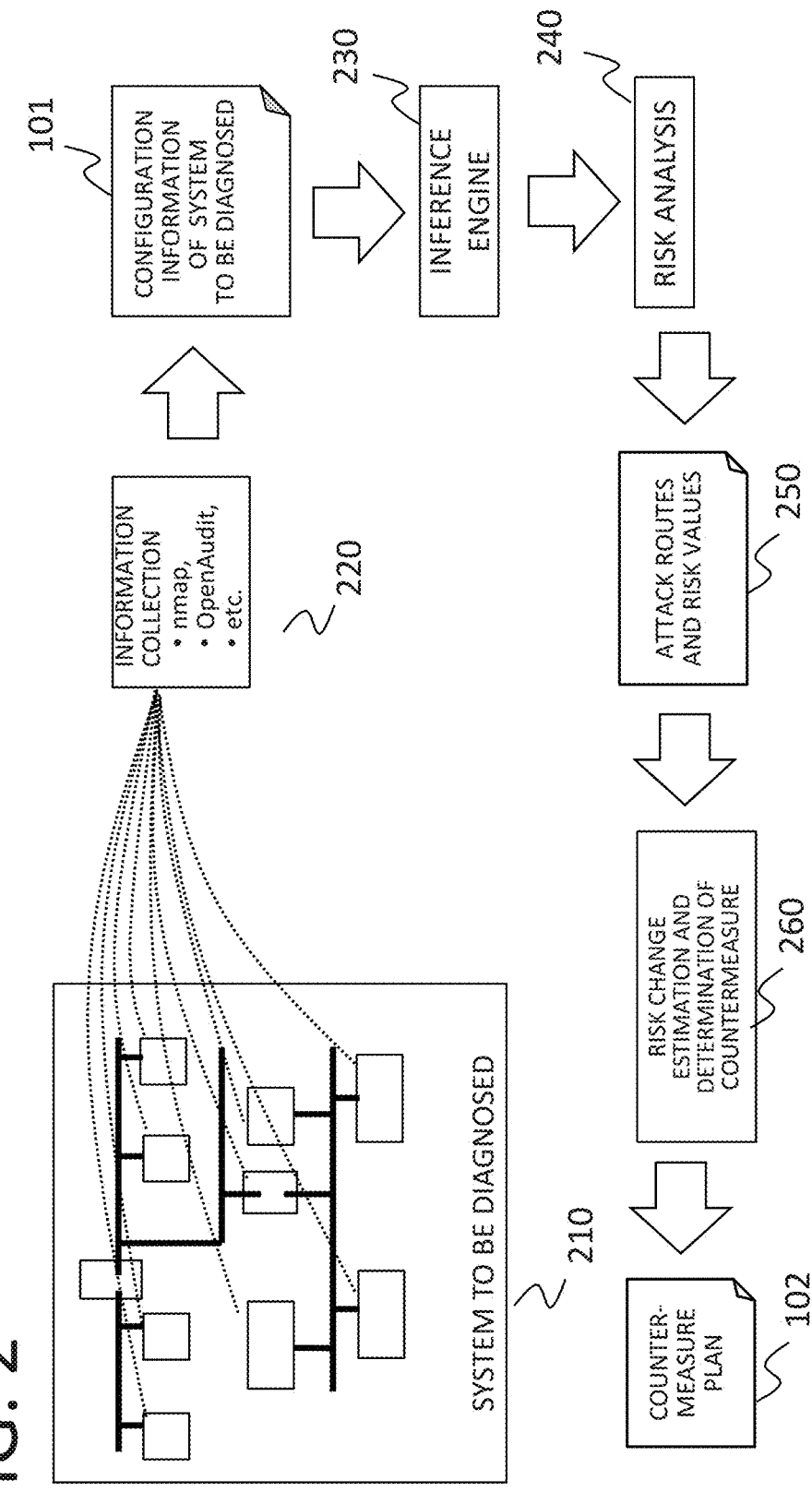
FIG. 2 is a diagram illustrating an example of a concept of an operation method of a security countermeasure planning system according to the example embodiment of the present invention.

First, an outline of an example embodiment of the present invention will be described with reference to drawings. Note, in the following outline, reference signs of the drawings are denoted to each element as an example for the sake of convenience to facilitate understanding, however, the present invention is not limited thereto. An individual connection line between blocks in the drawings, etc., referred to in the following description includes both one-way and two-way directions. A one-way arrow schematically illustrates a principal signal (data) flow and does not exclude bidirectionality.

Figure 1:
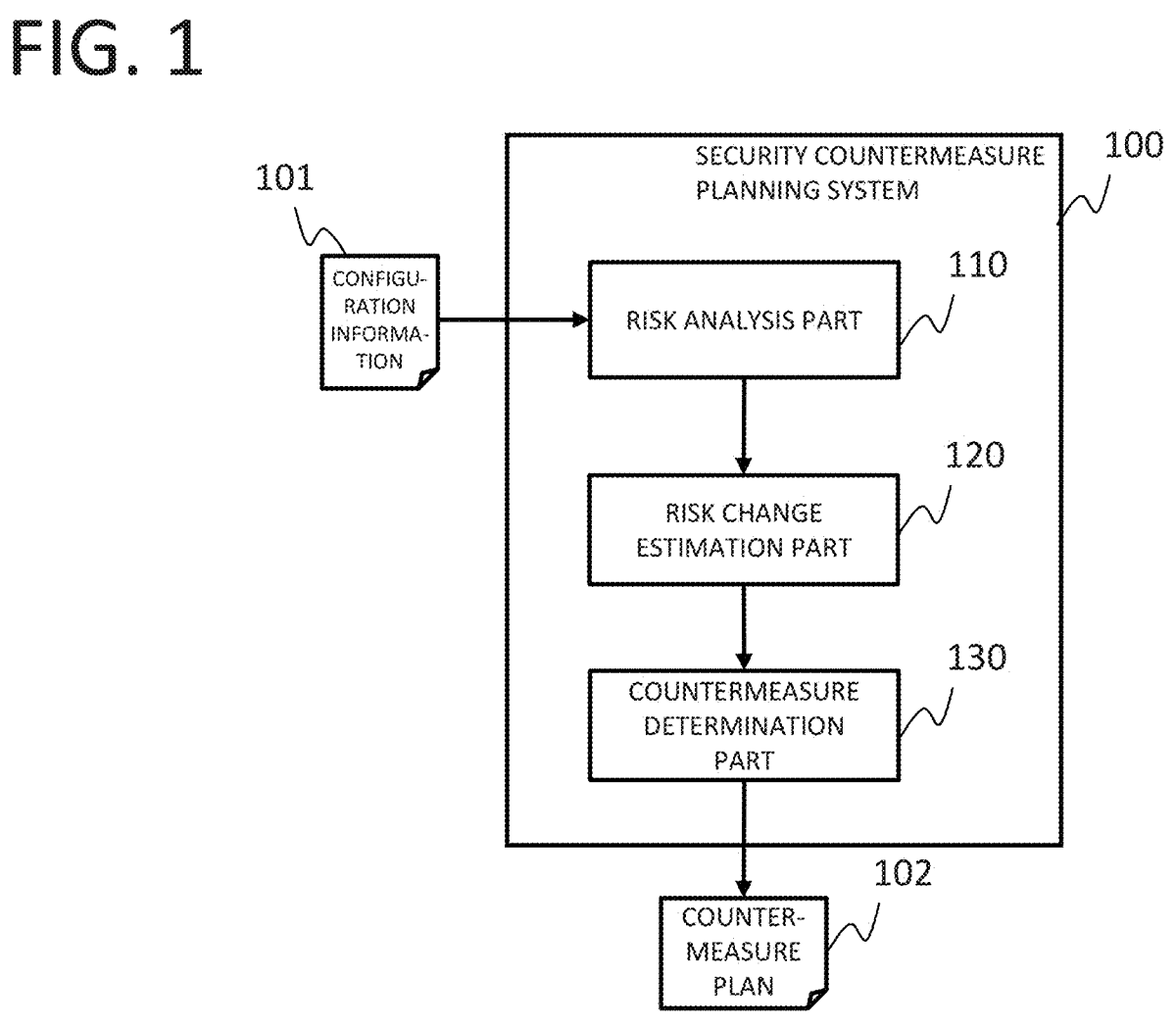

FIG. 1 is a diagram illustrating an example of a configuration of a security countermeasure planning system according to an example embodiment of the present invention. A security risk can be calculated from three (3) elements of a business damage level, a threat level, and a vulnerability level. For example, it is possible to quantify the three elements and determine a security risk value based on a product thereof. The business damage level represents how much damage occurs in a case where a threat occurs, the threat level represents a probability of occurrence of a threat, and the vulnerability level represents capability to accept a threat. A security countermeasure planning system according to the example embodiment of the present invention as described below can contribute to select appropriate countermeasure by estimating changes of the business damage level, the threat level, and the vulnerability level.

With reference to FIG. 1, a security countermeasure planning system 100 according to the example embodiment of the present invention includes a risk analysis part 110, a risk change estimation part 120, and a countermeasure determination part 130. The security countermeasure planning system 100 is supplied with configuration information 101 of a system to be diagnosed, and selects and outputs a security countermeasure plan 102.

FIG. 2 is a diagram illustrating an example of a concept of an operation method of the security countermeasure planning system 100 according to the example embodiment of the present invention. Information collection 220 is performed from a system to be diagnosed 210 for security countermeasure planning, configuration information 101 of the system to be diagnosed is acquired, a risk analysis 240 to the acquired configuration information 101 is performed by an inference engine 230, and one or more attack routes and one or more risk values 250 are extracted. A risk change estimation and determination of countermeasure are performed to the one or more attack routes and one or more risk values 250 and a countermeasure 102 is selected and outputted.

Figure 3:
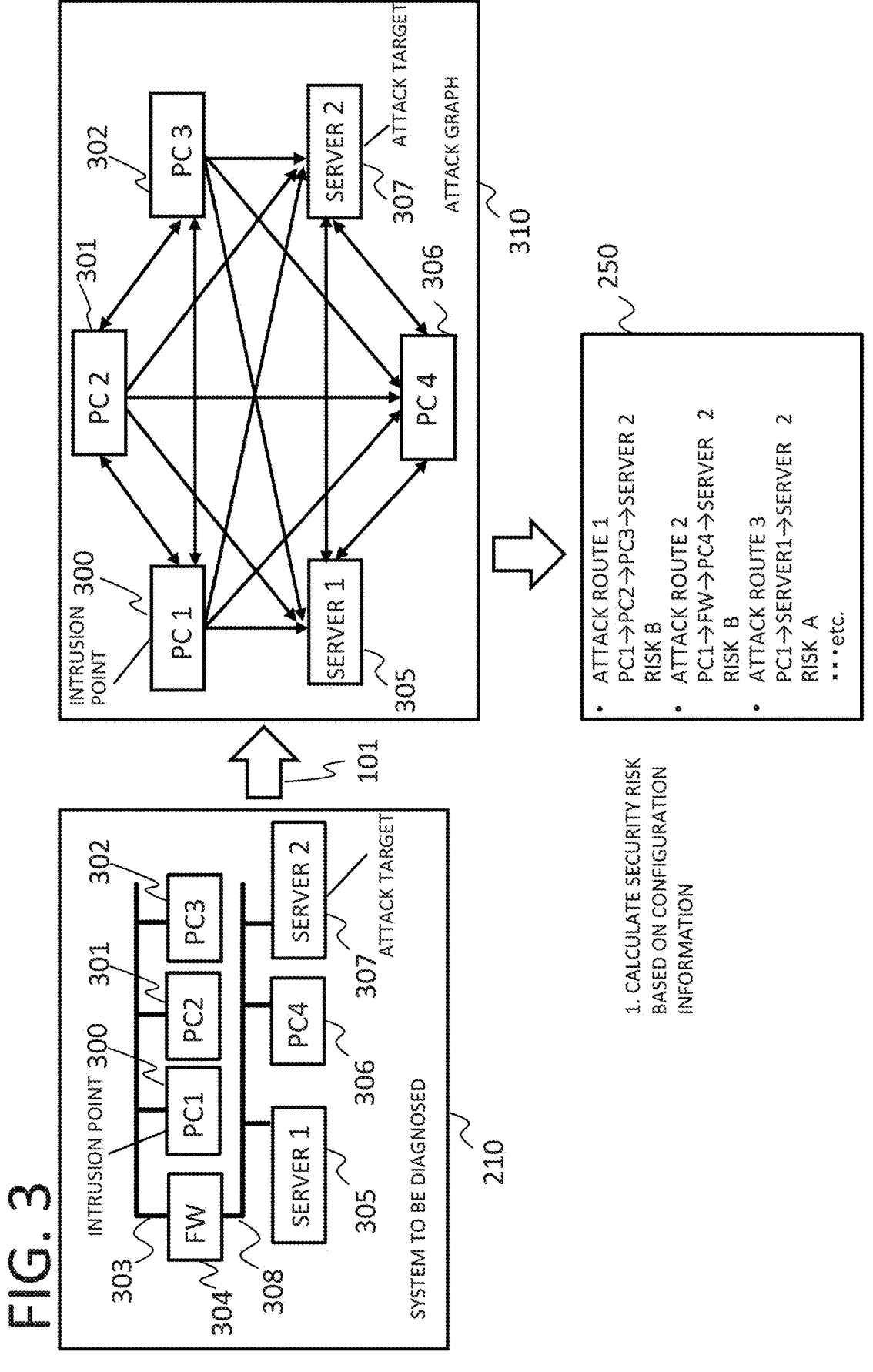
FIG. 3 is a diagram illustrating an outline of an example of an operation of a security countermeasure planning system according to the example embodiment of the present invention.

FIG. 3 and FIG. 4 are diagrams each illustrating an outline of an example of an operation of a security countermeasure planning system 100 according to the example embodiment of the present invention. By using FIG. 3 and FIG. 4, an operation of the security countermeasure planning system 100 according to the example embodiment of the present invention as shown in FIG. 1 will be described. It is assumed that one or more attack routes of an attacker and one or more risk values of the attack routes 250 as shown in FIG. 3 is followed by applicable countermeasures 320 as described in FIG. 4. In FIG. 3 and FIG. 4, elements denoted by the same reference numerals as those in FIG. 2 are the same elements.

FIG. 3 is a diagram illustrating an example of a configuration of the system to be diagnosed 210, an example of an image of attack graph 310 corresponding thereto and extracted attack routes and risk values. In the system to be diagnosed 210 as shown an example in FIG. 3, personal computers PC1, PC 2, and PC3 are connected via a network 303, a personal computer PC4, a server 1, and a server 2 are connected via a network 308, and the network 303 and the network 308 are connected via a fire wall FW. In a configuration as shown in FIG. 3, accesses from PC1, PC2, and PC3 to the server 1, PC4, and the server 2 are allowed.

Configuration information 101 extracted from the system to be diagnosed 210 as shown in FIG. 3 is supplied to the risk analysis part 110 as shown in FIG. 1. In the risk analysis part 110, a risk analysis is performed to extract one or more attack routes of an attacker and one or more risk values of the attack routes 250 from the configuration information 101 of the system to be diagnosed 210. In the risk analysis, the risk analysis part 110 extracts the attack graph 310 using the configuration information 101 of the system to be diagnosed 210 and extracts the one or more attack routes of an attacker and the one or more risk values of the attack routes 250 based on the attack graph 310. The extracted attack routes and the risk values 250 may include a plurality of attack routes (attack route 1, 2, 3, and so on) and risk values (risk values B, B, A, and so on) corresponding to respective attack routes.

Note, the attack graph 310 is extracted by analyzing the configuration information 101 of the system to be diagnosed 210 and nodes PC1, PC2, PC3, PC4, the server 1, and the server 2 of attack sources and attack destinations in the attack graph 310 correspond to hosts PC1, PC2, PC3, PC4, the server 1, and the server 2 in the system to be diagnosed 210. Attack routes in the attack routes and the risk values 250 are ones extracted from the attack graph 310 by concatenating attack steps (edges) which represent each attack route on the attack graph from an intrusion point to an attack target by enumerating nodes in a sequential order. In addition, risk values (risk B, risk A, and so on) in the attack routes and the risk values 250 represent a risk value of each attack route.

Note, an attack graph represents a chart or a diagrammatic representation showing flows (attack route) of possible combinations of each attack step. Each stage in which a different state is reached by an attack method is called an attack step. An attack route is one acquired by concatenating each attack step (an edge indicating an attack method).

Next, the risk change estimation part 120 as shown in FIG. 1 estimates risk time series changes which are one or more future risk estimation values of the one or more risk values of the attack routes extracted by the risk analysis part 110. In the present example embodiment, as an example, risk time series changes are estimated by estimating change of a vulnerability level. In estimating risk time series changes by estimating changes of a vulnerability level, the risk change estimation part 120 extracts applicable countermeasures 320 shown as an example in FIG. 4. Methods of countermeasures are, shown as an example in FIG. 4, updating an operating system (OS) in a personal computer PC2 (countermeasure plan 1), introducing Intrusion Prevention System (IPS) to a server room network (NW) (countermeasure plan 2), introducing anti-virus software to a server 1 (countermeasure plan 3), introducing anti-virus software to a server 2 (countermeasure plan 4), and so on.

Next, the risk change estimation part 120 as shown in FIG. 1 calculates risk time series changes 330 and 335 which are future risk estimation values in a case where each countermeasure is applied to each attack route. For example, as shown in FIG. 4, in a case where the countermeasure plan 1 is applied to, risk time series changes in which a risk value of an attack route 1 becomes E after a lapse of one week, D after a lapse of one month, and C after a lapse of a half year is estimated (330). Furthermore, in a case where the countermeasure plan 2 is applied to, a risk time series changes in which a risk value of an attack route 1 becomes C after a lapse of one week, C after a lapse of one month, and C after a lapse of a half year is estimated (335). The same applies to an attack route 2 and an attack route 3.

Next, the countermeasure determination part 130 as shown in FIG. 1 selects the countermeasure plan 102 according to the risk time series changes 330 and 335 estimated by the risk change estimation part 120 and output it. For example, as shown in FIG. 4 as an example, in a case where a policy 340 to minimize an average risk after a lapse of two months is employed, the countermeasure plan 2 to introduce IPS to the server room NW is selected and outputted as a final countermeasure plan 102.

As described above, it is possible to provide a security countermeasure planning system which contributes to select countermeasures based on time change of security risk existing in a system according to the example embodiment of the present invention.

First Example Embodiment

Figure 5:
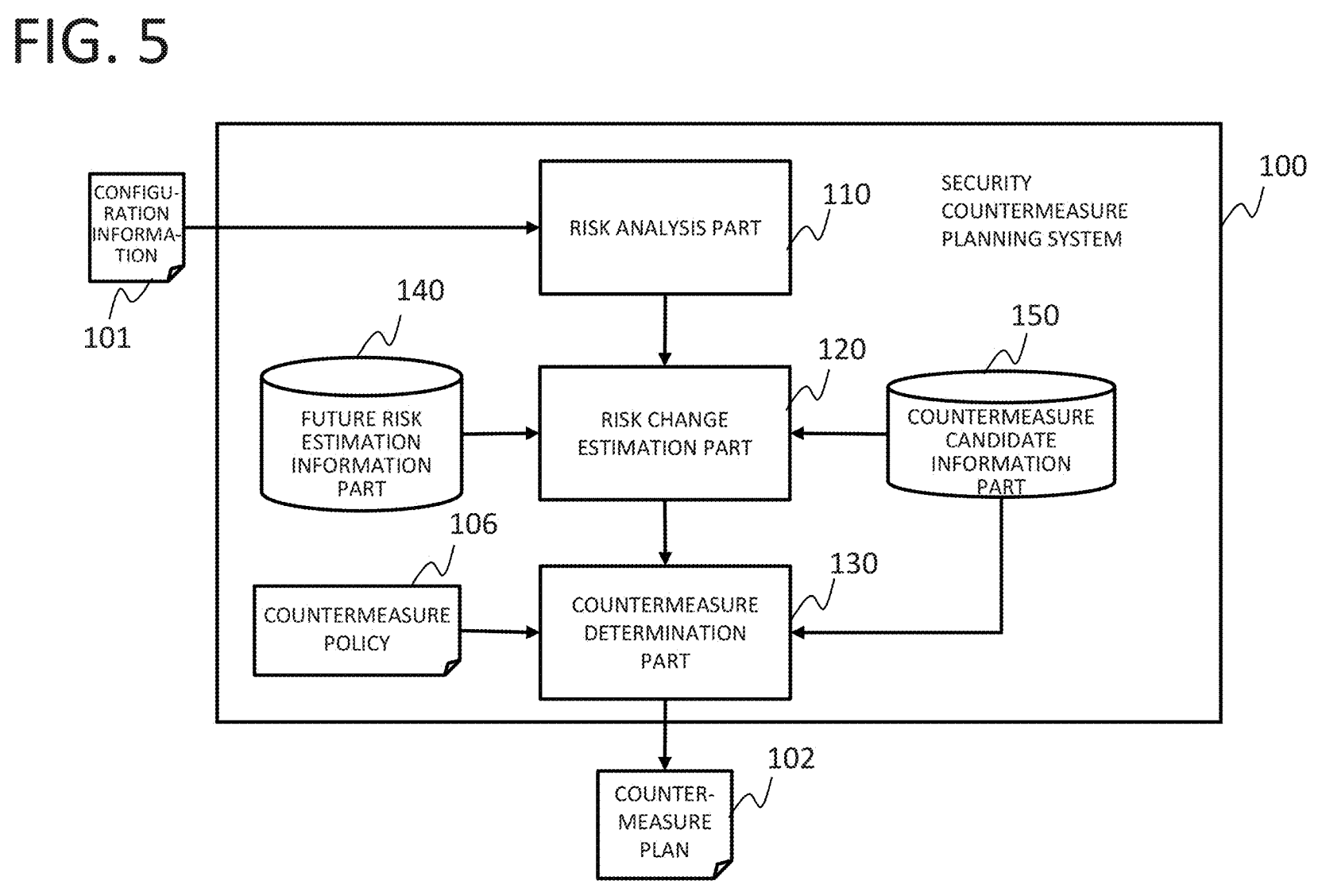

Next, a configuration of a security countermeasure planning system according to a first example embodiment of the present invention will be described with reference to drawings. FIG. 5 is a diagram illustrating an example of a configuration of a security countermeasure planning system 100 according to the first example embodiment of the present invention.

With reference to FIG. 5, the security countermeasure planning system 100 according to the first example embodiment of the present invention includes a risk analysis part 110, a risk change estimation part 120, a countermeasure determination part 130, a future risk estimation information part 140, and a countermeasure candidate information part 150. The risk analysis part 110 is supplied with configuration information 101 of a system to be diagnosed and the countermeasure determination part 130 selects a countermeasure plan 102 based on a countermeasure policy (policy information) 106 and outputs the countermeasure plan 102.

Figure 6:
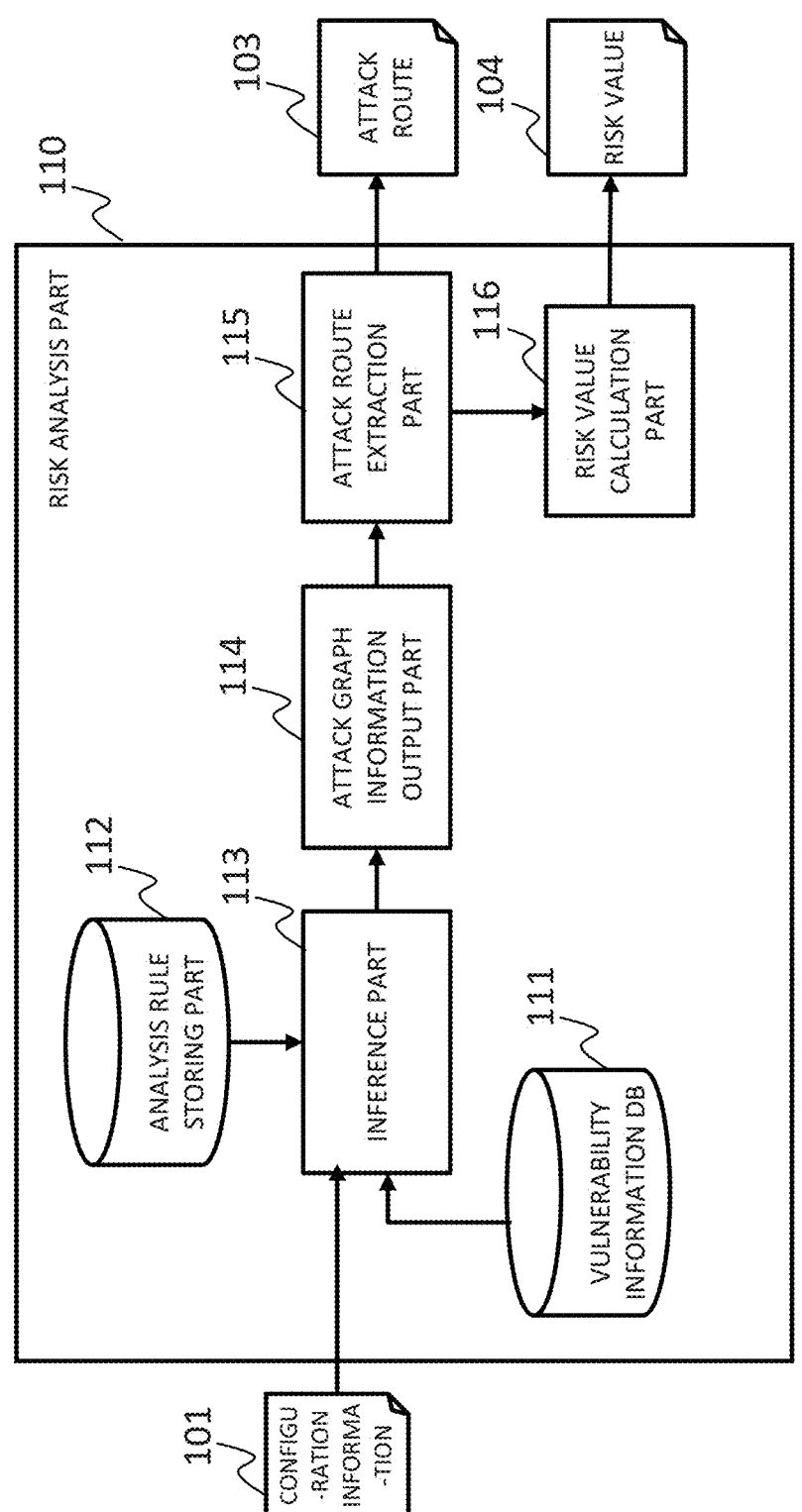
FIG. 6 is a diagram illustrating an example of a configuration of a risk analysis part of a security countermeasure planning system according to the first example embodiment of the present invention.

FIG. 6 is a diagram illustrating an example of a configuration of a risk analysis part 110 of a security countermeasure planning system 100 according to the first example embodiment of the present invention. With reference to FIG. 6, the risk analysis part 110 includes a vulnerability information database (DB) 111, an analysis rule storing part 112, an inference part 113, an attack graph information output part 114, an attack route extraction part 115, and a risk value calculation part 116. The risk analysis part 110 performs a risk analysis for extracting attack routes 1, 2, 3 and a risk value of each attack route as shown in FIG. 3, from configuration information 101 of a system to be diagnosed.

The inference part 113 infers what attack is possible from which host to which host based on collected configuration information 101 of a system to be diagnosed 210, for example, as shown in FIG. 3. Configuration information 101 includes information on host included in a system to be diagnosed 210, a network configuration, an operating system (OS) or software installed in each host, vulnerability information of each OS and software, and data flow information. The vulnerability database (DB) 111 stores an attack condition of each vulnerability, attack result, and so on. The analysis rule storing part 112 stores an analysis rule describing information about what attack can be performed under what condition. The attack graph information output part 114 outputs an attack graph such as an attack graph 310, for example, as shown in FIG. 3, by concatenating above information. Next, the attack route extraction part 115 extracts attack routes included in an attack route, such as attack routes 1, 2, and 3 shown in the attack routes and the risk values 250 shown as example in FIG. 3. Furthermore, the risk value calculation part 116 calculates risk values, such as risk values (risk B, risk B, and risk A) in the attack routes and the risk values 250, for example, as shown in FIG. 3, for each extracted attack route. As described above, the risk analysis part 110 extracts attack routes and a risk value of each attack route by performing a risk analysis from configuration information 101 of a system to be diagnosed.

Note, as an example of calculation of a risk value of an attack route, it is possible to employ a minimum value of risk values of attack steps included in an attack route as a risk value of the attack route. Furthermore, as an example of calculation of a risk value of an attack step, it is possible to determine a risk value for each attack method used for an attack step or for each vulnerability used for an attack. Furthermore, a risk value may be calculated by preparing a risk value table for each attack method. Furthermore, a risk value may also be determined by using a score of CVSS (Common Vulnerability Scoring System) for vulnerability.

The risk change estimation part 120 of the security countermeasure planning system according to the first example embodiment of the present invention as shown in FIG. 5 estimates risk time series changes which are future risk estimation values using information stored in a future risk estimation information part 140 and information stored in a countermeasure candidate information part 150.

First, information stored in a future risk estimation information part 140 and information stored in a countermeasure candidate information part 150 will be described.

FIG. 7 and FIG. 8 are diagrams illustrating an example of information stored in a future risk estimation information part 140 of a security countermeasure planning system 100 according to the first example embodiment of the present invention.

The future risk estimation information part 140 stores, as shown in FIG. 7, a configuration change history of a system to be diagnosed 141, an asset type of a host 142, an aggregation state of assets of a system to be diagnosed at a time of a risk analysis 143, an operation rule (operation information) of assets of a system to be diagnosed 144, and stores, as shown in FIG. 8, external factors including an attack code appearance probability 145 and a threat prediction 146. Note, necessary information described above as an example may be manually inputted to the future risk estimation information part 140 in advance. Furthermore, an aggregation state of assets 143 may be set by a risk analysis part 110. As to an attack code appearance probability 145 and a threat prediction 146, it is possible to collect information on Web. Furthermore, it is possible to create a configuration change history 141 based on configuration information used at the time of a past risk analysis.

FIG. 9 is a diagram illustrating an example of information stored in a countermeasure candidate information part 150 of a security countermeasure planning system 100 according to the first example embodiment of the present invention. The countermeasure candidate information part 150 stores a countermeasure type 151, an attack method against which a countermeasure is applicable (countermeasure target) 152, a countermeasure cost 153, and information about a time 156 including a time at which the countermeasure is applicable (a period of time needed to introduce countermeasure) 154, and variation information of an effect of the countermeasure 155.

Figure 10:
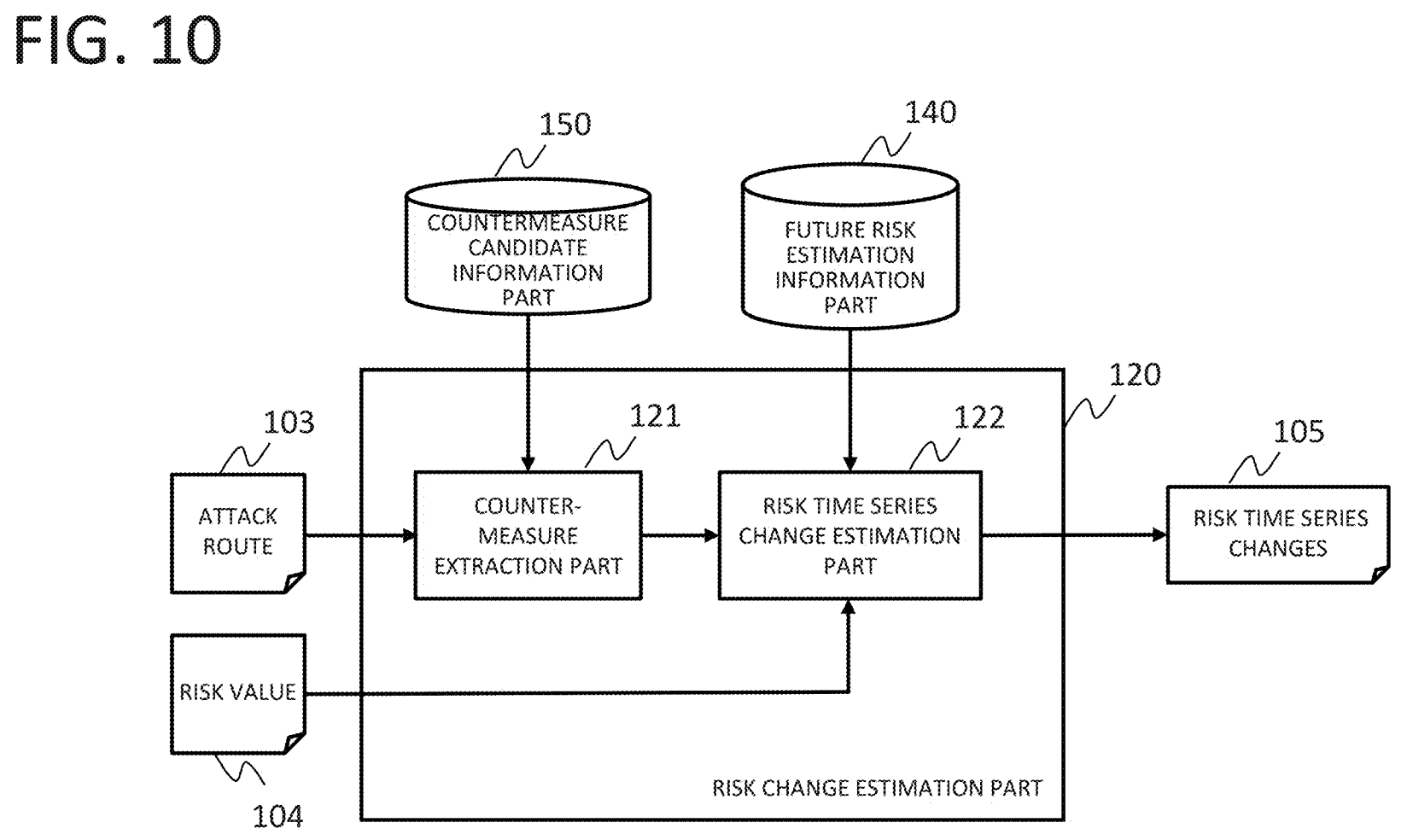

FIG. 10 is a diagram illustrating an example of a schematic configuration of a risk change estimation part 120 of a security countermeasure planning system 100 according to the first example embodiment of the present invention. With reference to FIG. 10, the risk change estimation part 120 includes a countermeasure extraction part 121 and a risk time series change estimation part 122.

The risk change estimation part 120 shown as an example in FIG. 10 determines one or more future risk estimation values based on at least one of estimation values of future changes of a business damage level, a threat level, and a vulnerability level to attack routes and risk values 104 of each attack route outputted from the risk analysis part 110. That is, to each attack route, it is estimated how risk values of each attack route will change in a future based on at least one of estimation values of future changes of a business damage level, a threat level, and a vulnerability level. Note, the estimation values of future changes of a business damage level, a threat level, and a vulnerability level are estimated as described below.

[1. Estimation of Changes of a Threat Level]

The risk time series change estimation part 122 performs estimation of changes of a threat level for risk values 104 of attack routes outputted from the risk analysis part 110 at a time of a risk analysis as described below, based on at least one piece of information of a configuration change history 141 of a system to be diagnosed stored in a future risk estimation information part 140, an asset type of a host 142, an aggregation state of assets of a system to be diagnosed at a time of a risk analysis 143, an operation rule (operation information) of assets of a system to be diagnosed 144, external factors including an attack code appearance probability 145 and a threat prediction 146, and so on.

(1-1) In a Configuration Change History of a System to be Diagnosed 141:

(1-1a) In a case where new pieces of software are frequently installed, a change of a threat level is estimated in such way that there is a probability that software having vulnerability may be installed in a future. For example, in a configuration change history, in a case where more than or equal to a predetermined number of software installations are performed in a predetermined period, it can be determined that new pieces of software are frequently installed.

(1-1b) In a case where a policy of a firewall (FW) is frequently changed, a change of a threat level is estimated in such way that there is a probability that a remote attack becomes to be possible in a future. For example, in a configuration change history, in a case where more than or equal to a predetermined number of changes of a policy of FW are performed in a predetermined period, it can be determined that a policy of FW is frequently changed.

(1-2) An Asset Type of a Host 142

In a case of an operational technology (OT) apparatus, a change of a threat level is estimated in such way that a risk is likely to increase because it is not possible to be updated.

(1-3) An Aggregation State of Assets of a System to be Diagnosed at a Time of a Risk Analysis 143

There is a case where assets having the same configuration are analyzed by aggregating the assets to one asset at a time of a risk analysis. In such case, a change of a threat level is estimated in such way that a risk is likely to increase because it is sufficient that any one of the hosts can be attacked in a case where a lot of hosts are aggregated.

(1-4) An Operation Rule (Operation Information) of Assets of a System to be Diagnosed 144

In a case where a server of which N years has passed from purchase is discarded, a change of a threat level is estimated in such way that a risk of the host being attacked will disappears in a future.

(1-5) An Attack Code Appearance Probability 145 of External Factors

After a vulnerability of software has been found, a threat level is estimated by predicting a probability that an attack code is found based on a past statistic information.

(1-6) A Threat Prediction 146 of External Factors

In a case where a newfangled attack method is used, a latest risk is increased. For example, during an event, a system of an eventologist or a system in the same region are likely to be attacked and a threat level is estimated to be high.

Note, for each piece of information from (1-1) to (1-6) as described above, estimation values of future changes of a threat level may be calculated for risk values 104 of attack routes outputted from the risk analysis part 110 at a time of a risk analysis, using a table for converting to concrete numerical values.

[2. Estimation of Changes of a Vulnerability Level]

The counter measure extraction part 121 of the risk change estimation part 120 extracts one or more parts to which a countermeasure can be applied based on the attack method against which a countermeasure is applicable (countermeasure target) 152 and the countermeasure type 151 stored in the countermeasure candidate information part 150 for attack routes 103 outputted from the risk analysis part 110. Next, the future vulnerability level is calculated in a case where the countermeasure is introduced, based on a countermeasure type 151 of each countermeasure, a time at which the countermeasure is applicable 154, and variation information of an effect of the countermeasure 155, for a combination of the countermeasure and the countermeasure application part. An estimation of the vulnerability level is performed by the countermeasure extraction part 121 based on at least one of the countermeasure type 151, the time at which the countermeasure is applicable 154, and the variation information of an effect of the countermeasure 155, as described below.

(2-1) Countermeasure Type

It is determined whether a countermeasure is temporary or permanent according to the countermeasure type 151, whereby a change of a vulnerability level is differently estimated.

(2-2) A Period Until a Countermeasure can be Introduced (a Time at which the Countermeasure is Applicable 154)

A change of a vulnerability level is differently estimated, depending on cases where a time at which the countermeasure is applicable represents immediately applicable, where time is required to purchase a product, where it is necessary to wait until a next configuration change timing, and where it is necessary to wait until a budget is secured, and so on.

(2-3) An Operation Rule in a Countermeasure Type 151

For example, in a case where software (SW) or an operating system (OS) is updated every N months, it is estimated that a probability that an attack is performed using a vulnerability is dropped every N months.

(2-4) A Period Until a Countermeasure Produces an Effect (Variation Information of an Effect of the Countermeasure 155)

In a case where a white list is learned, if time is taken for the learning, a period until a countermeasure produces an effect becomes long. It is estimated that a vulnerability level is not improved during the period.

[3. Estimation of Changes of a Business Damage Level]

Changes of a business damage level is estimated using information concerning a business damage level which has been inputted in advance. For example, when an impact caused by system shutdown during X month to Y month of a busy period is large, it is estimated that a business damage level is high.

In the risk change estimation part 120, the countermeasure extraction part 121 estimates and outputs the estimation values of the time changes of the vulnerability level in a case where each countermeasure stored in the countermeasure candidate information part 150 is applied to the attack routes 103 outputted by the risk analysis part 110 as described above and the risk time series change estimation part 122 estimates estimation values of changes of the vulnerability level based on the information stored in the future risk estimation information part 140. Then, the risk time series change estimation part 122 multiplies the risk values 104 of attack routes at a time of risk analysis outputted by the risk analysis part 110 with the estimation values of the time changes of the vulnerability level estimated by the counter measure extraction part 121 and the estimation values of changes of the vulnerability level estimated by the risk time series change estimation part 122, and estimates and outputs risk time series changes 105 which is future risk estimation values. In addition, risk time series changes 105 may be estimated by further multiplying with estimation values of changes of a business damage level inputted in advance. Note, risk time series changes 105 which is future risk estimation values may be estimated based on at least one of estimation values of changes of a vulnerability level, estimation values of changes of a threat level, estimation values of changes of a business damage level.

Figure 11:
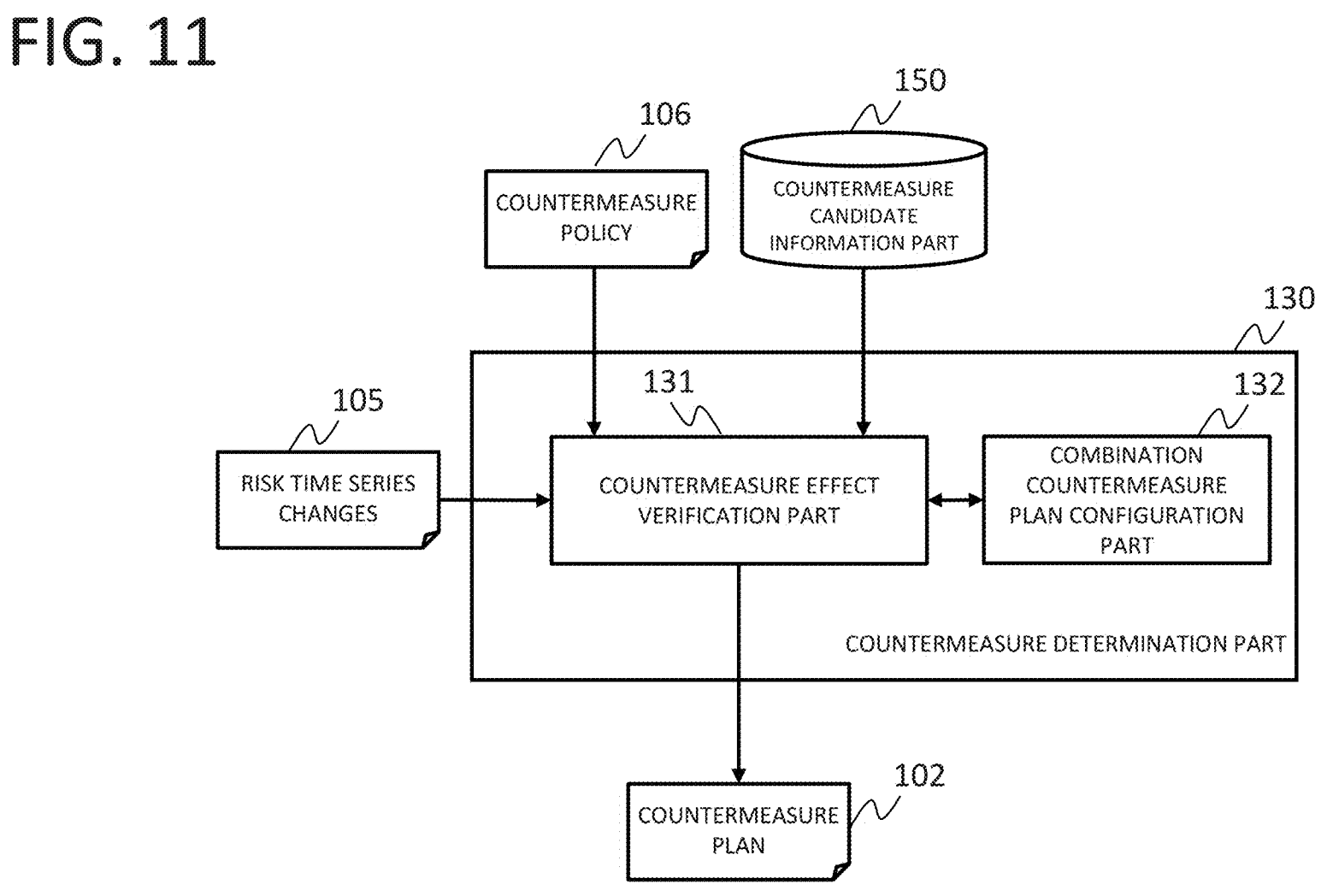

FIG. 11 is a diagram illustrating an example of a schematic configuration of a countermeasure determination part 130 of a security countermeasure planning system 100 according to the first example embodiment of the present invention. With reference to FIG. 11, the countermeasure determination part 130 includes a countermeasure effect verification part 131 and a combination countermeasure plan configuration part 132.

The countermeasure determination part 130 as shown in FIG. 11 verifies, based on risk time series changes 105 which is future risk estimation values for an attack route for each countermeasure estimated by the risk change estimation part 120, by the countermeasure effect verification part 131, whether each countermeasure plan satisfies a given countermeasure policy 106, with reference to a cost of each countermeasure stored in the countermeasure candidate information part 150.

An example of the countermeasure policy 106 supplied to the countermeasure effect verification part 131 of the countermeasure determination part 130 are as below.

(1) Making a risk be less than or equal to $\alpha$ within A weeks provided that a countermeasure cost is less than or equal to XXX.

(2) Making a risk be less than or equal to $\beta$ for a period as long as possible provided that a countermeasure cost is less than or equal to YYY.

(3) Minimize a risk from B month to C month provided that a countermeasure cost is less than or equal to ZZZ.

In a case where a countermeasure plan which satisfies a countermeasure policy 106 is found, the countermeasure effect verification part 131 selects and outputs the countermeasure policy 106 as a countermeasure plan 102.

On the other hand, in a case where a countermeasure plan which satisfies a countermeasure policy 106 is not found, a new countermeasure plan is configured by combining countermeasure plans by the combination countermeasure plan configuration part 132 and the countermeasure effect verification part 131 verifies whether the new countermeasure plan satisfies the given countermeasure policy 106 again. For example, as a simple way, all combinations of the countermeasure plans can be configured. Furthermore, a number of countermeasures to be combined may be gradually increased in a way that two countermeasures are combined at a first time and three countermeasures are combined at a second time.

FIG. 12 is a diagram illustrating an outline of an example of an operation of a countermeasure determination part 130 of a security countermeasure planning system 100 according to the first example embodiment of the present invention. The combination countermeasure plan configuration part 132 of the countermeasure determination part 130 can search every possible combination of attack routs to which countermeasures are applied satisfying a countermeasure policy, as a simple way. That is, as shown in a left part (1201, 1202) of FIG. 12 as an example, it is possible to select and output a countermeasure plan 1 or a countermeasure plan 2 in which countermeasure plans are applied and which satisfy a countermeasure policy 106. Note, as to an example of a risk as shown in FIG. 12, A represents the highest risk and a risk becomes lower in an order corresponding to A>B>C>D>E. Furthermore, as shown in a right part (1203) of FIG. 12 as an example, it is possible to select and output a combination of a countermeasure plan 1 and a countermeasure plan 2 in which countermeasure plans are applied and which satisfy a countermeasure policy 106. In a case of combined countermeasure plan, as shown in shaded parts in the right part (1203) of FIG. 12 as an example, a minimum value in respective estimation values of risks can be taken as an estimation value of a risk. Otherwise, a countermeasure plan can be selected and outputted for each cost in a way that a countermeasure plan whose cost is less than or equal to XX and which satisfies a policy or, a countermeasure plan whose cost is less than or equal to YY and which satisfies a policy.

FIG. 13 is a diagram illustrating examples of outputs (output example 1 and output example 2) of a countermeasure determination part 130 of a security countermeasure planning system 100 according to the first example embodiment of the present invention. As shown in FIG. 13 as examples, in addition to outputs of countermeasure plans, it is possible to include time series risk estimation values of attack routes in the outputs. The output example 1 of FIG. 13 represents a graph 1300 illustrating time change of an average risk value of respective attack routes in a case where no countermeasure 1301, a countermeasure plan X 1302, and a countermeasure plan Y 1303 are applied. The output example 2 of FIG. 13 represents a table type output 1310 of time change of risk values of respective attack routes in a case where no countermeasure 1301, a countermeasure X 1302, and a countermeasure Y 1303 are applied.

As described above, according to the first example embodiment of the present invention, it is possible to provide a security countermeasure planning system which contributes to select countermeasures based on time change of security risk existing in a system.

Second Example Embodiment

Figure 14:
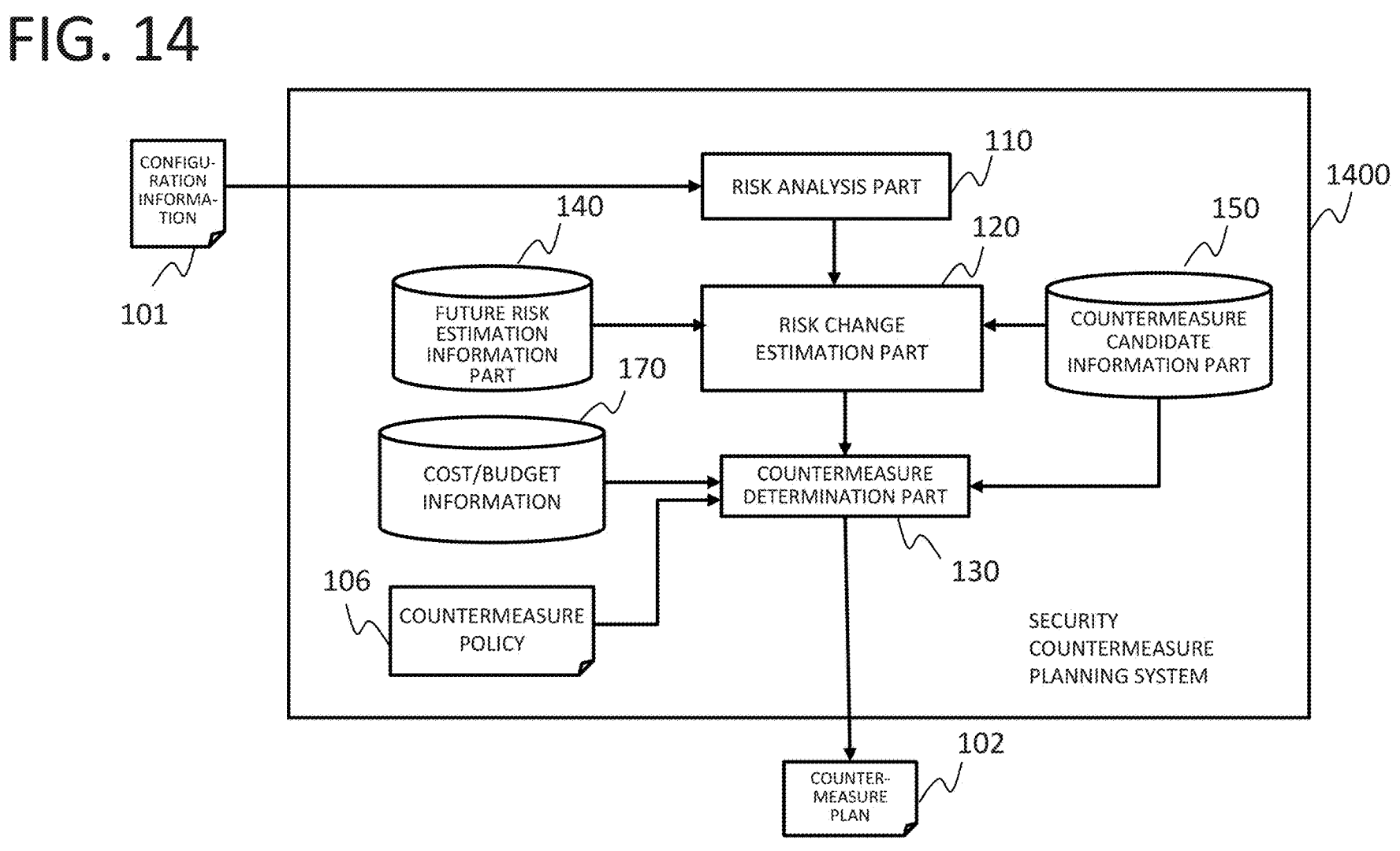

Next, a security countermeasure planning system 1400 according to a second example embodiment of the present invention will be described with reference to drawings. FIG. 14 is a diagram illustrating an example of a configuration of the security countermeasure planning system 1400 according to the second example embodiment of the present invention. In FIG. 14, elements denoted by the same reference numerals as those in FIG. 5 are the same elements and explanation thereof will be omitted.

The security countermeasure planning system 1400 according to the second example embodiment of the present invention as shown in FIG. 14 has a configuration in which a countermeasure determination part 130 of the security countermeasure planning system 100 according to the first example embodiment of the present invention as shown in FIG. 5 is supplied with a cost/budget information 170 in addition to a countermeasure policy 106 and the countermeasure determination part 130 determines a final countermeasure plan 102 according to risk time series changes which are future risk estimation values estimated by a risk change estimation part 120, a supplied countermeasure policy 106, and a cost/budget information 170.

Each countermeasure cost stored in a countermeasure candidate information part 150 varies with time in a way that it is possible to introduce it with a low cost at a timing of a periodic maintenance, changes of product prices (long-term discount), changes of labor costs. On the other hand, a budget of each year also varies with time. Therefore, the countermeasure determination part 130 modifies each counter measure cost which is stored in the countermeasure candidate information part 150 and is referred by the countermeasure determination part 130 according to cost information in the supplied cost/budget information 170, modifies the countermeasure policy 106 according to the budget information in the supplied cost/budget information 170 and determines a countermeasure plan 102 based on time change of the countermeasure cost/budget.

Third Example Embodiment

Figure 15:
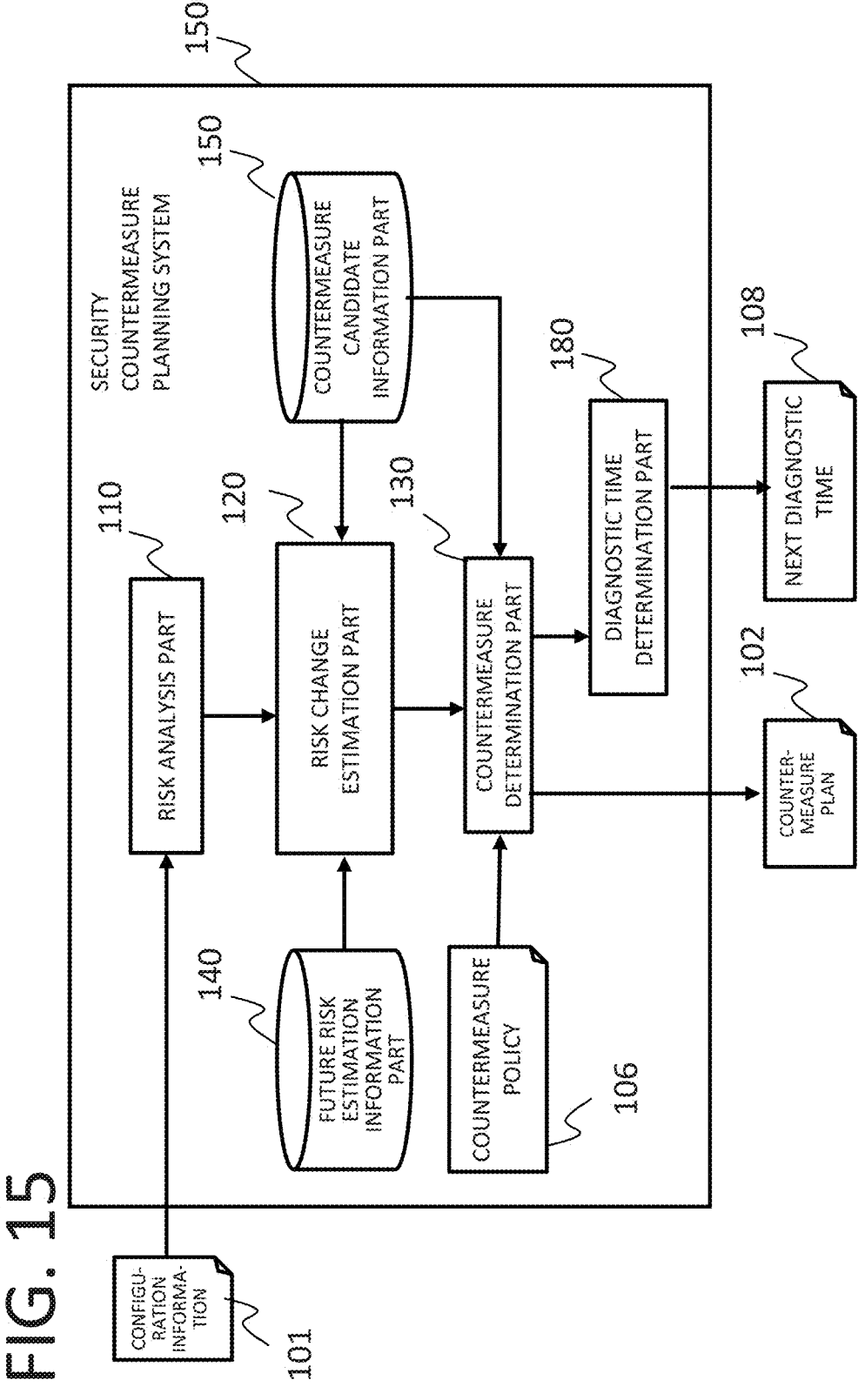
FIG. 15 is a diagram illustrating an example of a configuration of a security countermeasure planning system according to a third example embodiment of the present invention.

Next, a security countermeasure planning system according to a third example embodiment of the present invention will be described with reference to drawings. FIG. 15 is a diagram illustrating an example of a configuration of a security countermeasure planning system 1500 according to a third example embodiment of the present invention. In FIG. 15, elements denoted by the same reference numerals as those in FIG. 5 are the same elements and explanation thereof will be omitted.

The security countermeasure planning system 1500 according to a third example embodiment of the present invention as shown in FIG. 15 has a configuration in which a diagnostic time determination part 180 is added to an output of a countermeasure determination part 130 of the security countermeasure planning system 100 according to the first example embodiment of the present invention as shown in FIG. 5.

Figure 16:
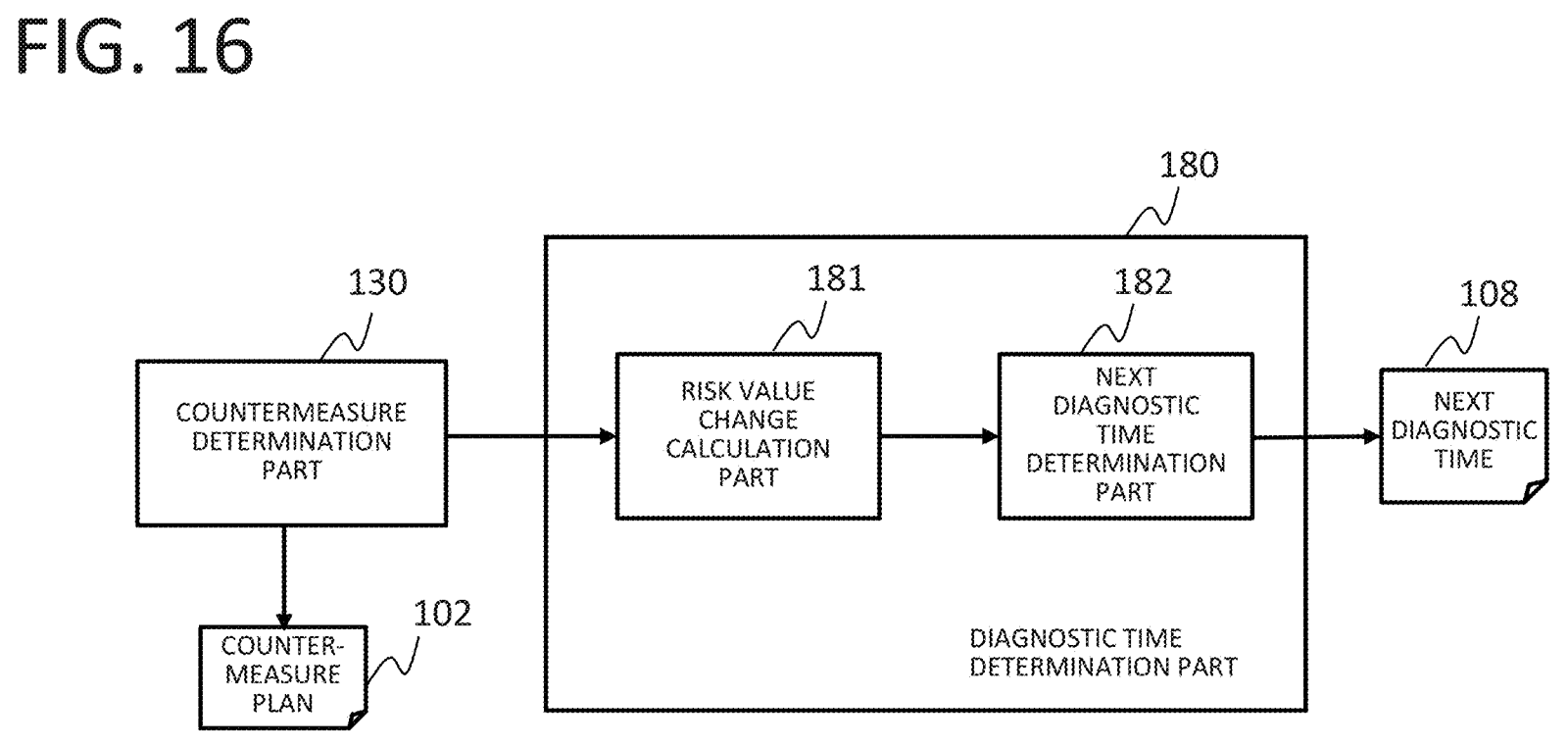

FIG. 16 is a diagram illustrating an example of a configuration of diagnostic time determination part 180 of the security countermeasure planning system 1500 according to the third example embodiment of the present invention. The diagnostic time determination part 180 includes a function to propose a next diagnostic time in a case where a countermeasure plan 102 selected and outputted by the countermeasure determination part 130 is employed. With reference to FIG. 16, the diagnostic time determination part 180 includes a risk value change calculation part 181 and a next diagnostic time determination part 182.

The risk value change calculation part 181 of the diagnostic time determination part 180 calculates changes of a risk value in a case where the countermeasure plan 102 is used. For example, as changes of a risk value, an average of risk values of attack routes of each time can be calculated. In addition, as changes of a risk value, changes of a risk value of a typical particular attack route can be used.

The next diagnostic time determination part 182 outputs a time when a changing risk value calculated by the risk value change calculation part 181 becomes higher than or equal to a predetermined threshold value, as a next diagnostic time 108.

Figure 17:
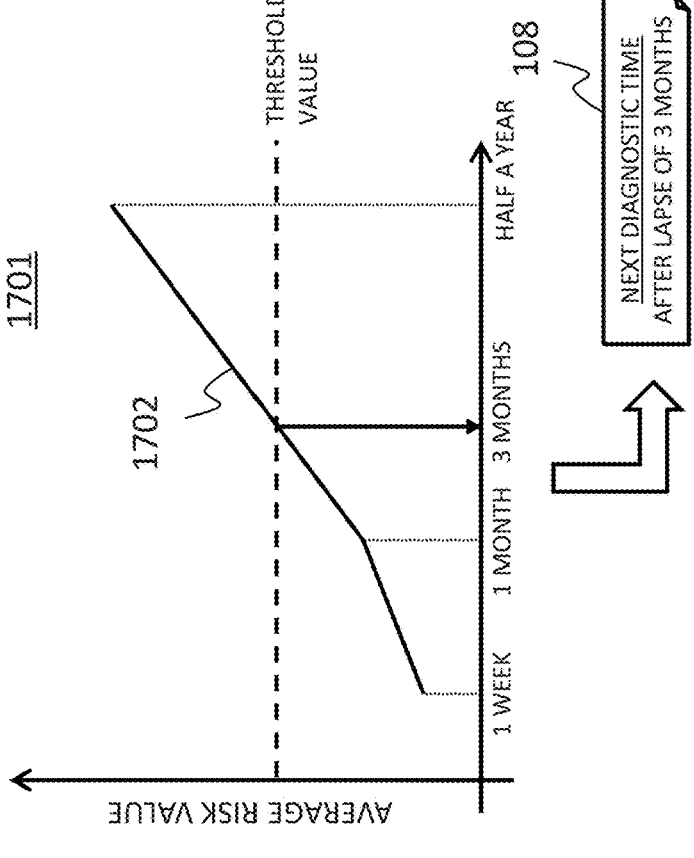
FIG. 17 is a diagram illustrating an example of an operation of a security countermeasure planning system according to the third example embodiment of the present invention.

FIG. 17 is a diagram illustrating an example of an operation of a security countermeasure planning system 1500 according to the third example embodiment of the present invention.

The diagnostic time determination part 180 outputs a next diagnostic time 108 at which it is estimated that a risk becomes high based on changes of risk time series changes which is a future risk estimation value of an average risk value of an attack route. For example, as to a countermeasure plan 102, in a case where risk time series changes which is a future risk estimation value of each attack route varies with time as illustrated by an example in a table of a left part of FIG. 17, a time at which an average risk estimation value 1702 of an attack route exceeds a threshold value as illustrated by an example (1701) in right part of FIG. 17 is outputted as a next diagnostic time 108. Note, a next diagnostic time 108 may be a time at which a risk analysis is performed once again or may be a time at which planning of a countermeasure plan 102 is reviewed. Furthermore, a threshold value used for determination of a time at which planning of a countermeasure plan 102 is reviewed may be different from a threshold value used for determination of a time to perform a risk analysis once again.

Fourth Example Embodiment

Figure 18:
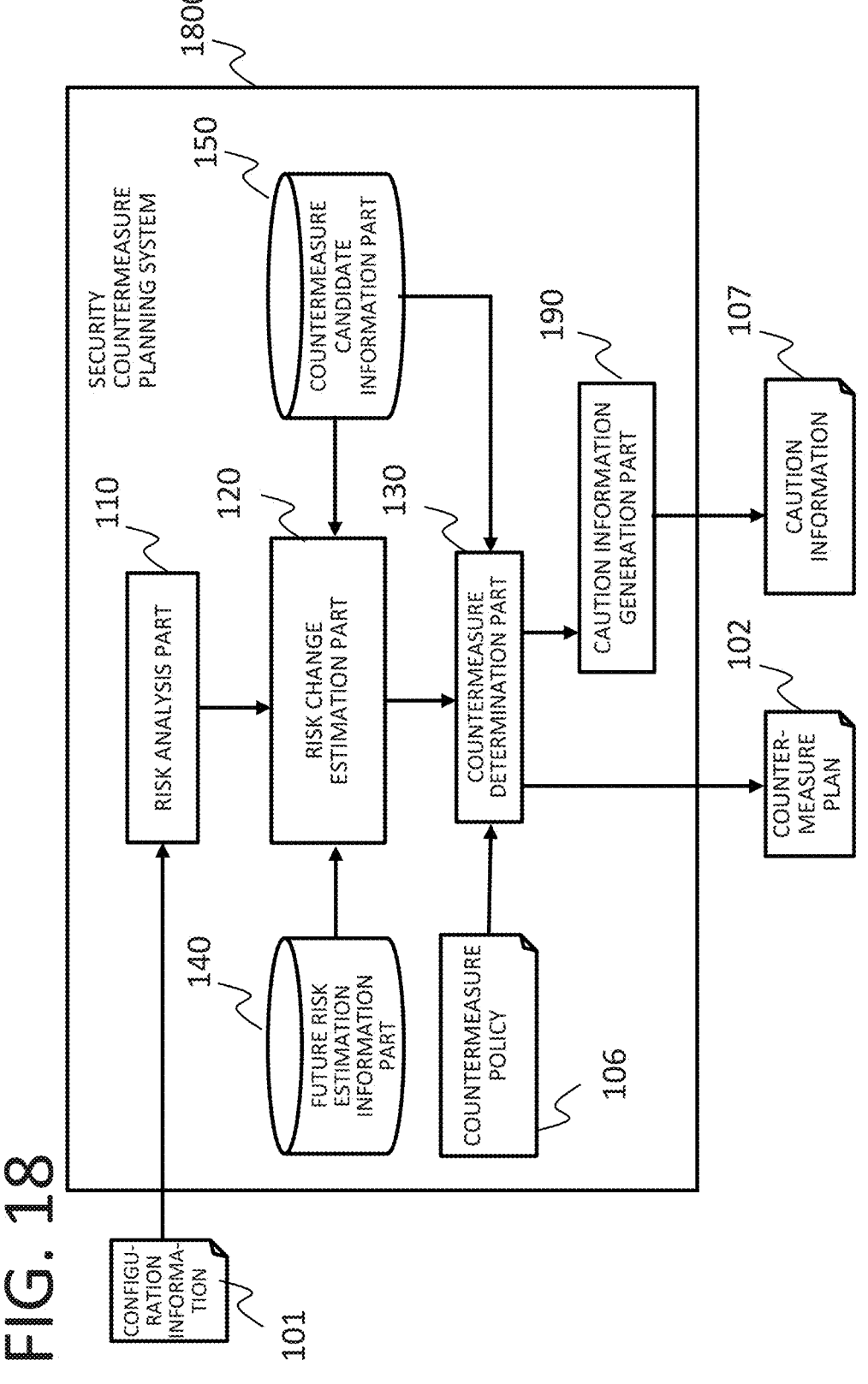
FIG. 18 is a diagram illustrating an example of a configuration of a security countermeasure planning system according to a fourth example embodiment of the present invention.

Next, a security countermeasure planning system according to a fourth example embodiment of the present invention will be described with reference to drawings. FIG. 18 is a diagram illustrating an example of a configuration of a security countermeasure planning system 1800 according to the fourth example embodiment of the present invention. In FIG. 18, elements denoted by the same reference numerals as those in FIG. 5 are the same elements and explanation thereof will be omitted.

The security countermeasure planning system 1800 according to the fourth example embodiment of the present invention as shown in FIG. 18 has a configuration in which a caution information generation part 190 is added to an output of a countermeasure determination part 130 of the security countermeasure planning system 100 according to the first example embodiment of the present invention as shown in FIG. 5.

FIG. 19 is a diagram illustrating an example of a configuration of the caution information generation part 190 of the security countermeasure planning system 1800 according to the fourth example embodiment of the present invention.

The caution information generation part 190 generates a time at which it is estimated that a risk becomes high and information of an attack route, in a case where a countermeasure 102 selected and outputted by the countermeasure determination part 130 is employed. With reference to FIG. 19, the caution information generation part 190 includes a risk value change calculation part 191 and a caution time determination part 192.

The caution time determination part 192 and the risk value change calculation part 191 calculate changes of a risk value in a case where a countermeasure plan 102 is used. For example, as changes of a risk value, an average of risk values of attack routes of each time can be calculated. Furthermore, as changes of a risk value, changes of a risk value of a typical particular attack route can be used.

The caution time determination part 192 outputs a time at which a changing risk value calculated by the risk value change calculation part 191 becomes higher than or equal to a predetermined threshold value, as caution information 107.

Figure 20:
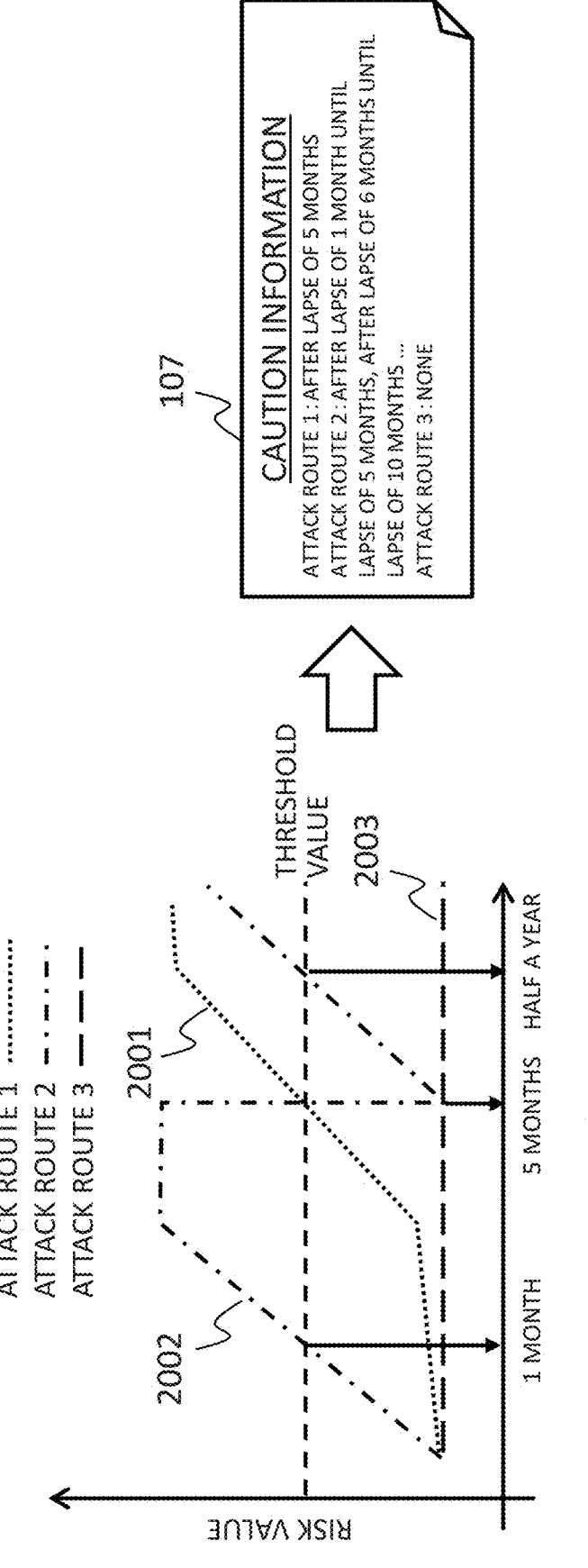
FIG. 20 is a diagram illustrating an example of an operation of a security countermeasure planning system according to the fourth example embodiment of the present invention.

FIG. 20 is a diagram illustrating an example of an operation of the security countermeasure planning system 1800 according to the fourth example embodiment of the present invention. The caution information generation part 190 generates caution information 107 by extracting a time at which a risk of an attack route becomes high based on a future risk estimation value for each of attack routes 1 to 3, as shown in FIG. 20.

For example, in an example as shown in FIG. 20, a future risk estimation value exceeds a threshold value after a lapse of 5 months for an attack route 1 (2001), a future risk estimation value exceeds a threshold value after a lapse of 1 month until a lapse of 5 months and after a lapse of 6 months until a lapse of 10 months for an attack route 2 (2002), and a future risk estimation value does not exceed a threshold value for an attack route 3 (2003). Note, as to an example of an attack route 2 (2002), a risk value may oscillate in the same way as that of an attack route 2 (2002) in a case where OS is updated periodically.

Correspondingly, caution information 107 is generated by extracting a period during which a risk value of an attack route exceeds a threshold, that is, after a lapse of 5 months for the attack route 1 (2001), after a lapse of 1 month until a lapse of 5 months and after a lapse of 6 months until a lapse of 10 months for the attack route 2 (2002), as a caution needed period of an attack route. Note, caution information is not generated for the attack route 3 (2003).

The example embodiments of the present invention have been described as above, however, the present invention is not limited thereto. Further modifications, substitutions, or adjustments can be made without departing from the basic technical concept of the present invention. For example, the configurations of the system and the elements and the representation modes of the message or the like illustrated in the individual drawings are merely used as examples to facilitate the understanding of the present invention. Thus, the present invention is not limited to the configurations illustrated in the drawings. In addition, "A and/or B" in the following description signifies at least one of A or B.

Figure 21:
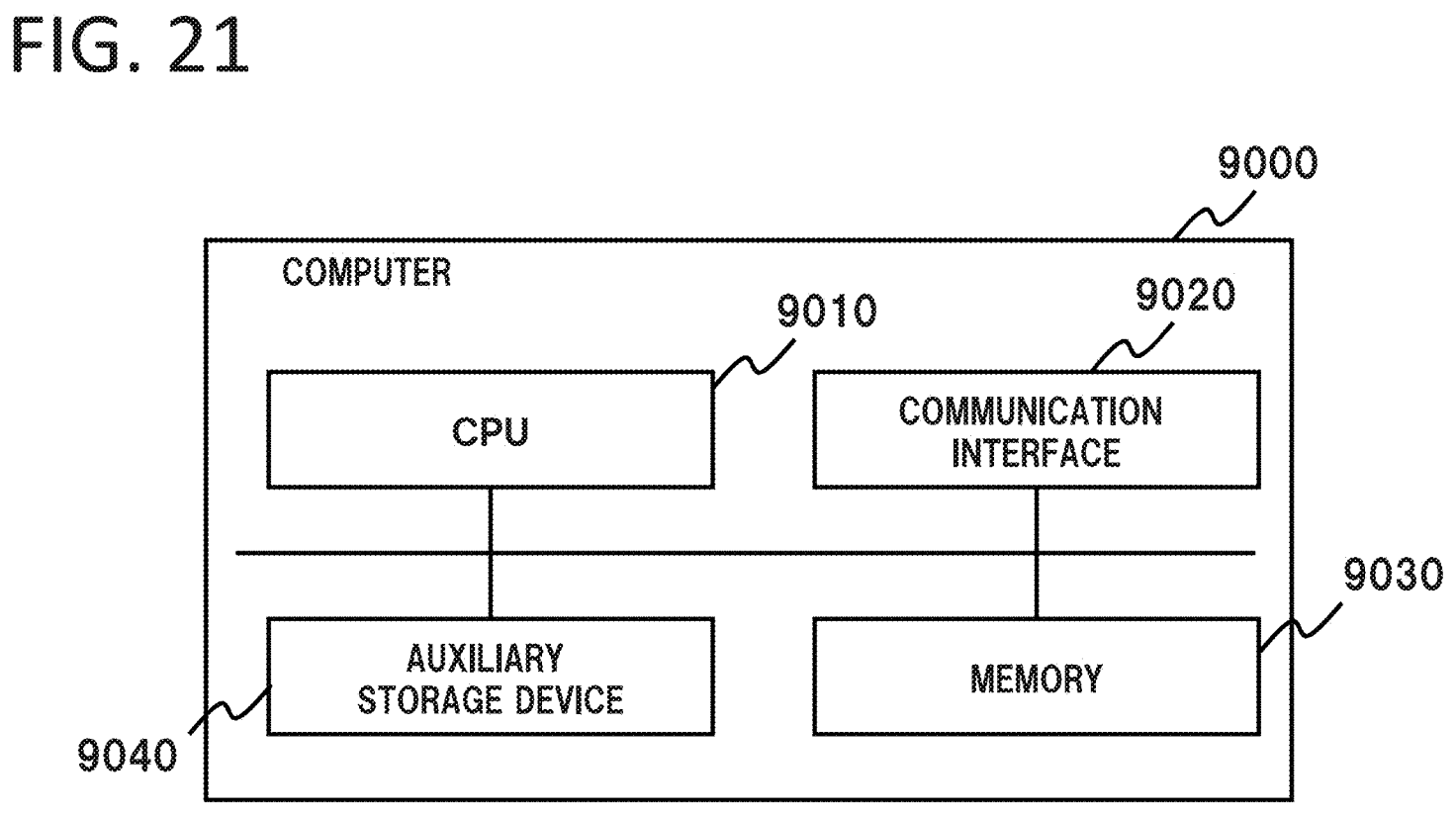

In addition, the procedures described in the above first to fourth example embodiments can each be realized by a program causing a computer (9000 in FIG. 21) functioning as the security countermeasure planning systems 100, 1400, 1500, and 1800 to realize the functions as the security countermeasure planning systems 100, 1400, 1500, and 1800. For example, this computer is configured to include a CPU (Central Processing Unit) 9010, a communication interface 9020, a memory 9030, and an auxiliary storage device 9040 in FIG. 21. That is, the CPU 9010 in FIG. 21 executes a security countermeasure planning program and performs processing for updating various calculation parameters stored in the auxiliary storage device 9040 or the like.

The memory 9030 is a RAM (Random Access Memory) or a ROM (Read-Only Memory), and so on.

That is, the individual parts (processing means, functions) of each of the security countermeasure planning system in the first to fourth example embodiments as described above can each be realized by a computer program that causes a processor of the computer to execute the corresponding processing described above by using corresponding hardware.

Finally, suitable modes of the present invention will be summarized.

[Mode 1]

(See the security countermeasure planning system according to the above first aspect)

[Mode 2]

It is preferable to be the security countermeasure planning system according to mode 1, wherein the risk change estimation part estimates the one or more future risk estimation values based on at least one of estimation values of future changes of a business damage level, a threat level, and a vulnerability level.

[Mode 3]

It is preferable to be the security countermeasure planning system according to mode 2, wherein the risk change estimation part estimates the estimation values of the future changes of the threat level based on at least one of a configuration change history of the system to be diagnosed, a host resource type, an aggregation state of the resource of the system to be diagnosed at a time of calculation of the risk value of the resource, an operation rule of the resource of the system to be diagnosed, and an appearance probability of an attack code and a thereat estimation.

[Mode 4]

It is preferable to be the security countermeasure planning system according to mode 2 or 3, wherein the risk change estimation part extracts one or more parts of the resources to which a countermeasure is applied for each countermeasure, and estimates the estimation values of the future changes of the vulnerability level in a case where the countermeasure is introduced based on at least one of a countermeasure type, a time at which the countermeasure is applicable, and variation information of an effect of the countermeasure, for a combination of the countermeasure and the part to which the countermeasure is applied.

[Mode 5]

It is preferable to be the security countermeasure planning system according to any one of modes 2 to 4, wherein the countermeasure determination part determines the countermeasure plan using the future risk estimation value, a countermeasure policy, and a cost required for the countermeasure.

[Mode 6]

It is preferable to be the security countermeasure planning system according to mode 5, wherein the countermeasure determination part determines a final countermeasure plan according to the future risk estimation value estimated by the risk change estimation part, the inputted countermeasure policy, the cost required for the countermeasure, and a countermeasure cost and budget information.

16

[Mode 7]

It is preferable to be the security countermeasure planning system according to any one of modes 1 to 6, further comprising a diagnostic time determination part which determines a next diagnostic time to the selected countermeasure plan.

[Mode 8]

It is preferable to be the security countermeasure planning system according to any one of modes 1 to 7, further comprising a caution information generation part which generates information of time at which it is expected that the risk value of the resource for the countermeasure plan increases against the selected countermeasure plan.

[Mode 9]

(See the attack route extraction method according to the above second aspect)

[Mode 10]

(See the program according to the above third aspect)

The above modes 9 and 10 can be expanded to the modes 2 to 8 in the same way as the mode 1 is expanded.

The disclosure of each of the above PTLs is incorporated herein by reference thereto. Modifications and adjustments of the example embodiments or examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be construed to have been concretely disclosed.

REFERENCE SIGNS LIST

100 security countermeasure planning system
101 configuration information
102 countermeasure plan
106 countermeasure policy
107 caution information
108 next diagnostic time
110 risk analysis part
111 vulnerability information database (DB)
112 analysis rule storing part
113 inference part
114 attack graph information output part
115 attack route extraction part
116 risk value calculation part
120 risk change estimation part
121 countermeasure extraction part
122 risk time series change estimation part
130 countermeasure determination part
131 countermeasure effect verification part
132 combination countermeasure plan configuration part
140 future risk estimation information part
150 countermeasure candidate information part
170 cost/budget information
180 diagnostic time determination part
181 risk value change calculation part
182 next diagnostic time determination part
190 caution information generation part

191 risk value change calculation part
192 caution time determination part
9000 computer
9010 CPU
9020 communication interface
9030 memory
9040 auxiliary storage device
What is claimed is:

1. A security countermeasure planning system, comprising:

at least a processor; and a memory in circuit communication with the processor, wherein the processor is configured to execute program instructions stored in the memory to perform:

calculating one or more risk values of one or more resources included in a system to be diagnosed using the configuration information of the system to be diagnosed;

risk change estimation of estimating one or more future risk estimation values of the one or more risk values of the one or more resources which are calculated based on at least one of estimation values of future changes of a business damage level, a threat level, and a vulnerability level; and countermeasure determination of selecting a countermeasure plan, among a plurality of countermeasure plan, based on the one or more future risk estimation values estimated by the risk change estimation, and determining a time at which the risk estimation value for the selected countermeasure plan is estimated to exceed a determined threshold value as a next diagnostic time or a time at which a risk analysis is performed once again, wherein the threshold value used for determination of the next diagnostic time is different from a threshold value used for determination of the time to perform the risk analysis once again, and wherein the risk change estimation comprises obtaining the one or more future risk estimation values as time series corresponding to each of the plurality of countermeasure plan applied to each of a plurality of attack routes, wherein the time series comprises:

a first time series corresponding to a first countermeasure plan, among the plurality of countermeasure plan, applied to a first attack route among the plurality of attack routes, a second time series corresponding to a second countermeasure plan, among the plurality of countermeasure plan, applied to the first attack route among the plurality of attack routes, a third time series corresponding to a third countermeasure plan, among the plurality of countermeasure plan, applied to a second attack route among the plurality of attack routes, and a fourth time series corresponding to a fourth countermeasure plan, among the plurality of countermeasure plan, applied to the second attack route among the plurality of attack routes.

2. The security countermeasure planning system according to claim 1, wherein the risk change estimation comprises estimating the estimation values of the future changes of the threat level based on at least one selected from a group consisting of a configuration change history of the system to be diagnosed, a host resource type, an aggregation state of the resource of the system to be diagnosed at a time of calculation of the risk value of the resource, an operation rule of the resource of the system to be diagnosed, and an appearance probability of an attack code and a thereat estimation.

3. The security countermeasure planning system according to claim 1, wherein the risk change estimation comprises:

extracting one or more parts of the resources to which a countermeasure is applied for each countermeasure, and estimating the estimation values of the future changes of the vulnerability level in a case where the countermeasure is introduced based on at least one selected from a group consisting of a countermeasure type, a time at which the countermeasure is applicable, and variation information of an effect of the countermeasure, for a combination of the countermeasure and the part to which the countermeasure is applied.

4. The security countermeasure planning system according to claim 1, wherein the countermeasure determination comprises determining the countermeasure plan using the future risk estimation value, a countermeasure policy, and a cost required for the countermeasure.

5. The security countermeasure planning system according to claim 4, wherein the countermeasure determination comprises determining a final countermeasure plan according to the future risk estimation value estimated by the risk change estimation, the inputted countermeasure policy, the cost required for the countermeasure, and a countermeasure cost and budget information.

6. The security countermeasure planning system according to claim 1, wherein the processor is configured to execute the program instructions stored in the memory to perform:

caution information generation of generating information of time at which it is expected that the risk value of the resource for the countermeasure plan increases against the selected countermeasure plan.

7. A security countermeasure planning method, comprising:

calculating one or more risk values of one or more resources included in a system to be diagnosed using the configuration information of the system to be diagnosed;

risk change estimation of estimating one or more future risk estimation values of the calculated one or more risk values of the one or more resources based on at least one of estimation values of future changes of a business damage level, a threat level, and a vulnerability level;

countermeasure determination of selecting a countermeasure plan, among a plurality of countermeasure plan, based on the estimated one or more future risk estimation values, and determining a time at which the risk estimation value for the selected countermeasure plan is estimated to exceed a determined threshold value as a next diagnostic time or a time at which a risk analysis is performed once again, wherein the threshold value used for determination of the next diagnostic time is different from a threshold value used for determination of the time to perform the risk analysis once again, and wherein the risk change estimation comprises obtaining the one or more future risk estimation values as time series corresponding to each of the plurality of coun-
termeasure plan applied to each of a plurality of attack
routes,
wherein the time series comprises:
    a first time series corresponding to a first countermeasure plan, among the plurality of countermeasure
      plan, applied to a first attack route among the plu-
      rality of attack routes,
    a second time series corresponding to a second coun-
      termeasure plan, among the plurality of countermeasure plan, applied to the first attack route among the
      plurality of attack routes,
    a third time series corresponding to a third counter-
      measure plan, among the plurality of countermeasure
      plan, applied to a second attack route among the
plurality of attack routes, and
    a fourth time series corresponding to a fourth counter-
      measure plan, among the plurality of countermeasure
      plan, applied to the second attack route among the
      plurality of attack routes.

8. The security countermeasure planning method accord-
ing to claim 7,
wherein the risk change estimation comprises estimating
the estimation values of the future changes of the threat
level based on at least one selected from a group
consisting of a configuration change history of the
system to be diagnosed, a host resource type, an
aggregation state of the resource of the system to be
diagnosed at a time of calculation of the risk value of
the resource, an operation rule of the resource of the
system to be diagnosed, and an appearance probability
of an attack code and a thereat estimation.

9. The security countermeasure planning method accord-
ing to claim 7,
wherein the risk change estimation comprises:
extracting one or more parts of the resources to which a
    countermeasure is applied for each countermeasure,
    and
estimating the estimation values of the future changes of
    the vulnerability level in a case where the countermeasure is introduced based on at least one selected from
    a group consisting of a countermeasure type, a time at
    which the countermeasure is applicable, and variation
    information of an effect of the countermeasure, for a
    combination of the countermeasure and the part to
which the countermeasure is applied.

10. The security countermeasure planning method accord-
ing to claim 7,
wherein the countermeasure determination comprises
determining the countermeasure plan using the future
risk estimation value, a countermeasure policy, and a
cost required for the countermeasure.

11. The security countermeasure planning method accord-
ing to claim 10,
wherein the countermeasure determination comprises
determining a final countermeasure plan according to
the future risk estimation value estimated by the risk
change estimation, the inputted countermeasure policy,
the cost required for the countermeasure, and a coun-
termeasure cost and budget information.

12. A computer-readable non-transitory recording
medium recording a program, wherein the program causes a
computer to perform processing comprising:
calculating one or more risk values of one or more
resources included in a system to be diagnosed using
the configuration information of the system to be
diagnosed;

risk change estimation of estimating one or more future
risk estimation values of the calculated one or more risk
values of the one or more resources based on at least
one of estimation values of future changes of a business
damage level, a threat level, and a vulnerability level;
countermeasure determination of selecting a countermea-
sure plan based on the estimated one or more future risk
estimation values, and
determining a time at which the risk estimation value for
the selected countermeasure plan is estimated to exceed
a determined threshold value as a next diagnostic time
or a time at which a risk analysis is performed once
again,
wherein the threshold value used for determination of the
next diagnostic time is different from a threshold value
used for determination of the time to perform the risk
analysis once again, and
wherein the risk change estimation comprises obtaining
the one or more future risk estimation values as time
series corresponding to each of the plurality of coun-
termeasure plan applied to each of a plurality of attack
routes,
wherein the time series comprises:
    a first time series corresponding to a first countermea-
      sure plan, among the plurality of countermeasure
      plan, applied to a first attack route among the plu-
      rality of attack routes,
    a second time series corresponding to a second coun-
      termeasure plan, among the plurality of countermea-
      sure plan, applied to the first attack route among the
      plurality of attack routes,
    a third time series corresponding to a third counter-
      measure plan, among the plurality of countermeasure
      plan, applied to a second attack route among the
      plurality of attack routes, and
    a fourth time series corresponding to a fourth counter-
      measure plan, among the plurality of countermeasure
      plan, applied to the second attack route among the
      plurality of attack routes.

13. The medium according to claim 12,
wherein the risk change estimation comprises estimating
the estimation values of the future changes of the threat
level based on at least one selected from a group
consisting of a configuration change history of the
system to be diagnosed, a host resource type, an
aggregation state of the resource of the system to be
diagnosed at a time of calculation of the risk value of
the resource, an operation rule of the resource of the
system to be diagnosed, and an appearance probability
of an attack code and a thereat estimation.

14. The medium according to claim 12,
wherein the risk change estimation comprises:
extracting one or more parts of the resources to which a
    countermeasure is applied for each countermeasure,
    and
estimating the estimation values of the future changes of
    the vulnerability level in a case where the countermea-
    sure is introduced based on at least one selected from
    a group consisting of a countermeasure type, a time at
    which the countermeasure is applicable, and variation
    information of an effect of the countermeasure, for a
    combination of the countermeasure and the part to
    which the countermeasure is applied.

15. The medium according to claim 12,
wherein the countermeasure determination comprises
determining the countermeasure plan using the future risk estimation value, a countermeasure policy, and a cost required for the countermeasure.

16. The medium according to claim 15, wherein the countermeasure determination comprises determining a final countermeasure plan according to the future risk estimation value estimated by the risk change estimation, the inputted countermeasure policy, the cost required for the countermeasure, and a countermeasure cost and budget information.

\* \* \* \* \*